(12) United States Patent
Toyoda

(10) Patent No.: US 12,548,119 B2
(45) Date of Patent: Feb. 10, 2026

(54) INFORMATION PROCESSING APPARATUS, CONTROL METHOD FOR INFORMATION PROCESSING APPARATUS, AND STORAGE MEDIUM FOR SUPERIMPOSITION OF IMAGES AND INFORMATION IN VIDEO IMAGES

(71) Applicant: CANON KABUSHIKI KAISHA, Tokyo (JP)

(72) Inventor: Takuya Toyoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 18/644,683

(22) Filed: Apr. 24, 2024

(65) Prior Publication Data
US 2024/0362752 A1 Oct. 31, 2024

(30) Foreign Application Priority Data
Apr. 27, 2023 (JP) ................. 2023-073644

(51) Int. Cl.
*G06T 19/00* (2011.01)
*G06T 5/50* (2006.01)
*G06T 11/60* (2006.01)
*G06V 10/25* (2022.01)
*G06V 40/20* (2022.01)

(52) U.S. Cl.
CPC ............. *G06T 5/50* (2013.01); *G06T 11/60* (2013.01); *G06T 19/006* (2013.01); *G06V 10/25* (2022.01); *G06V 40/28* (2022.01); *G06T 2207/20044* (2013.01); *G06T 2207/20221* (2013.01);
(Continued)

(58) Field of Classification Search
None
See application file for complete search history.

(56) References Cited

U.S. PATENT DOCUMENTS 5,943,049 A * 8/1999 Matsubara .............. G06T 11/00
715/715
2005/0197578 A1 9/2005 Aratani et al.
(Continued)

FOREIGN PATENT DOCUMENTS

JP 2005287004 A 10/2005
JP 2010039125 A 2/2010
(Continued)

*Primary Examiner* — Joni Hsu
(74) *Attorney, Agent, or Firm* — Canon U.S.A., Inc. IP Division

(57) ABSTRACT

An information processing apparatus that makes it possible to see information in an easily understandable manner when this information is superimposed onto a video image has at least one memory and at least one processor. The at least one memory and the at least one processor are configured to extract a region of a human in an image; superimpose predetermined superimposition information onto the image; determine whether or not the human is performing a predetermined action, and to output determination results; extract a region of the predetermined information that overlaps with the region of the human as an overlapping region based on the determination results, the region of the human, and the predetermined information; and change a transparency of at least a portion of the predetermined information such that the transparency increases according to the overlapping region.

13 Claims, 25 Drawing Sheets

(52) U.S. Cl.
CPC ............... *G06T 2207/30196* (2013.01); *G06T 2210/62* (2013.01); *G06V 2201/07* (2022.01)

(56) References Cited

U.S. PATENT DOCUMENTS

| | | | |
|---|---|---|---|
| 2015/0153570 A1* | 6/2015 | Yamamoto | H04M 1/72448 345/184 |
| 2017/0316575 A1* | 11/2017 | Adachi | G06T 5/50 |
| 2020/0218335 A1* | 7/2020 | Soroker | G06F 3/167 |
| 2021/0135892 A1* | 5/2021 | Ghanaie-Sichanie | H04L 12/1831 |
| 2022/0101840 A1* | 3/2022 | Natarajan | G10L 15/02 |
| 2023/0022924 A1 | 1/2023 | Iwai | |
| 2023/0164296 A1* | 5/2023 | Chang | G06F 3/0485 348/14.09 |
| 2023/0260534 A1* | 8/2023 | Escudero | H04S 1/007 704/3 |
| 2024/0021019 A1* | 1/2024 | Yu | G06T 7/277 |

FOREIGN PATENT DOCUMENTS

| | | | |
|---|---|---|---|
| JP | 2016194877 A | 11/2016 | |
| JP | 6046961 B2 | 12/2016 | |
| JP | 2020155961 A | 9/2020 | |
| JP | 2023016269 A | 2/2023 | |

* cited by examiner

| Speech contents | Region, Area |
|---|---|
| Region 1 | ABCD, English |
| Region 2 | Cubic function, Area, Point of intersection, Region |

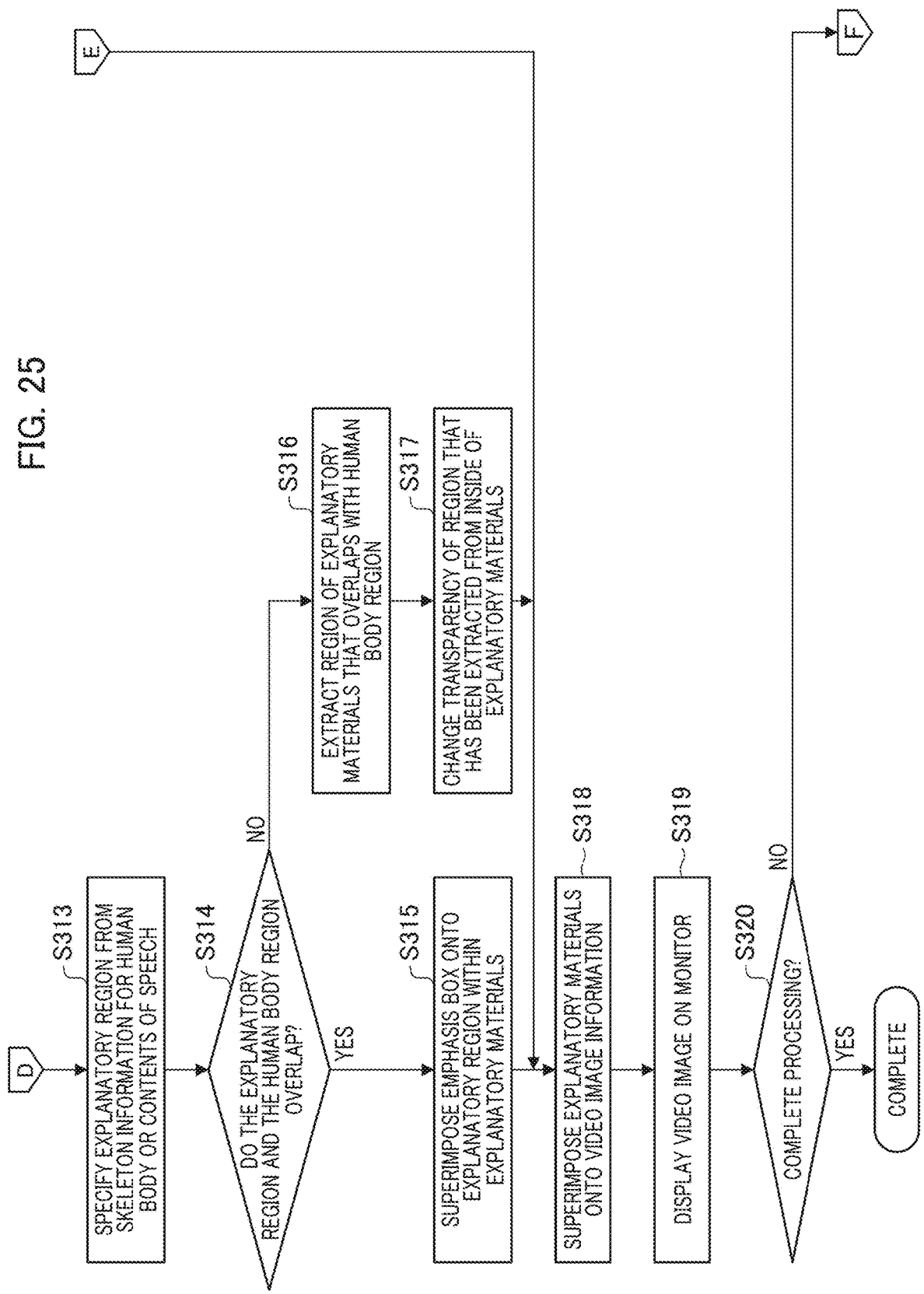

INFORMATION PROCESSING APPARATUS, CONTROL METHOD FOR INFORMATION PROCESSING APPARATUS, AND STORAGE MEDIUM FOR SUPERIMPOSITION OF IMAGES AND INFORMATION IN VIDEO IMAGES

BACKGROUND

Field of the Disclosure

The present disclosure relates to an information processing apparatus, a control method for an information processing apparatus, a storage medium, and the like.

Description of the Related Art

In recent years, during the automatic image capturing of a lecture scene, there has been an increase in image capturing in which information that is being explained by a human body is superimposed (overlayed) onto a video image that is being captured of the human body. In such a case, designs are employed such that the background of the video image onto which this has been superimposed does not become difficult to see.

In Japanese Patent No. 6046961, when a second video image (a CG person or a sign language interpreter) is superimposed onto a first video image (a background), image information that has been extracted from a first image is used, and the display position and transparency of a second video image are controlled, thereby making it easier to see the background. The image information that has been extracted from the first image is a saliency map that has been created from program information, and a region on which a person focuses.

However, in Japanese Patent No. 6046961, when superimposing the second video image onto the first video image, the transparency of a region that overlaps with a human body region cannot be changed in a case in which the human body is performing an explanatory gesture, and in a case in which they are not.

In addition, when information (referred to as the second video image in Japanese Patent No. 6046961) has been superimposed onto a video image that has been captured of a human body (referred to as the first video image in Japanese Patent No. 6046961), there are cases in which it becomes difficult to see and understand the information in the video for which superimposition has been performed. Therefore, there is a concern that someone who is watching this video will not be able to follow the contents that the human body is explaining due to the information that is superimposed.

SUMMARY

As one aspect of the present disclosure, an information processing apparatus comprises at least one memory and at least one processor. The at least one memory and the at least one processor are configured to extract a region of a human in an image; superimpose predetermined superimposition information onto the image; determine whether or not the human is performing a predetermined action, and to output determination results; extract a region of the predetermined superimposition information that overlaps with the region of the human as an overlapping region based on the determination results, the region of the human, and the predetermined superimposition information; and change a transparency of at least a portion of the predetermined superimposition information such that a transparency thereof increases according to the overlapping region.

Further features of various embodiments will become apparent from the following description of embodiments with reference to the attached drawings.

BRIEF DESCRIPTION OF THE DRAWINGS

FIG. 25 is a flowchart showing processing procedures for an automatic image capturing system according to the Fourth Embodiment.

DESCRIPTION OF THE EMBODIMENTS

Hereinafter, with reference to the accompanying drawings, example modes of the present disclosure will be described using Embodiments. In each diagram, the same reference signs are applied to the same members or elements, and duplicate descriptions will be omitted or simplified.

First Embodiment

Figure 1:
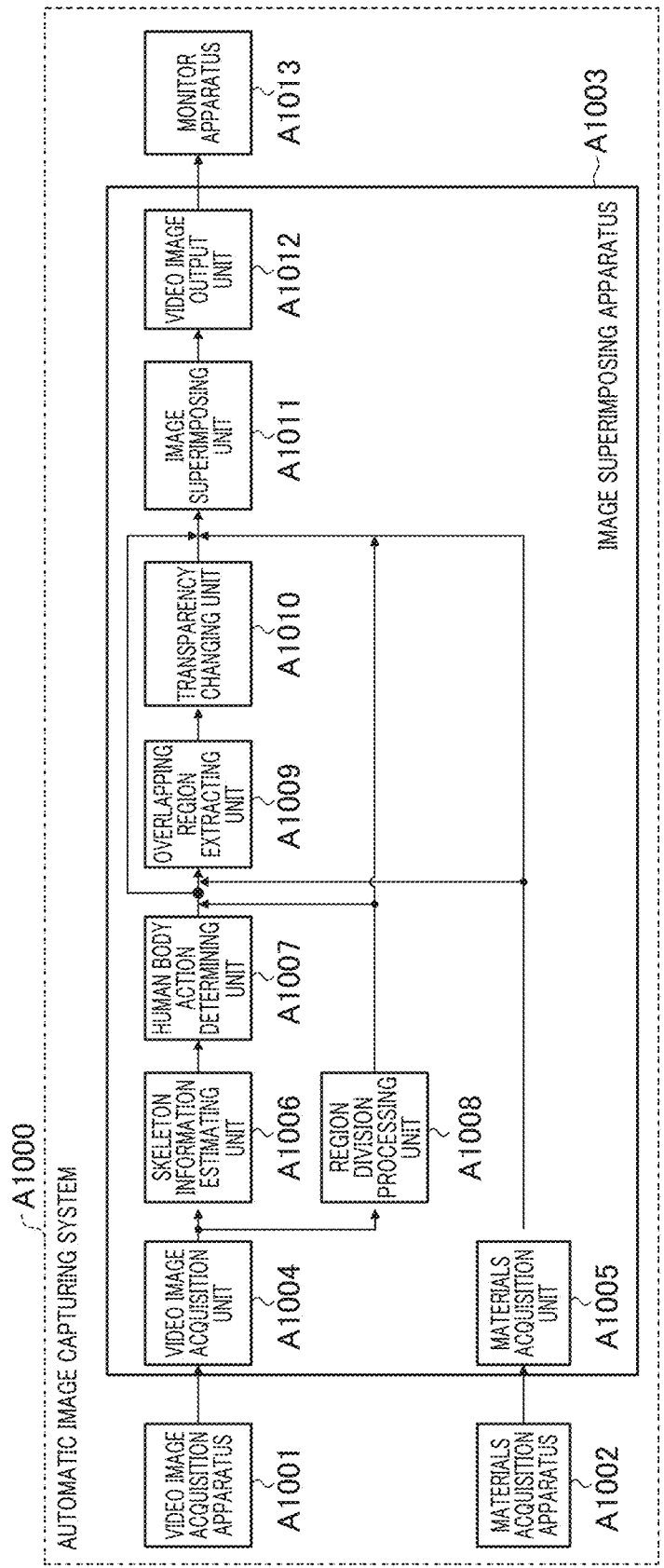
FIG. 1 is a configuration block diagram of an automatic image capturing system according to the First Embodiment.

A configurational example of an image superimposing apparatus A1003 according to the First Embodiment will be explained below in reference to FIG. 1. FIG. 1 is a block diagram showing a functional configuration of an automatic image capturing system A1000 comprising an image superimposing apparatus A1003 according to the First Embodiment. The image superimposing apparatus A1003 functions as a processing apparatus (an information processing apparatus) that executes each type of processing, such as human body extraction processing, explanatory action determination processing, image superimposition processing, and the like, using each functional unit that will be described below.

The automatic image capturing system A1000 detects a human body (a person) from a video image (video image information) that has been captured and determines explanatory actions of the human body that has been detected. In addition, the automatic image capturing system A1000 makes a region in which a region (an overlapping region) of explanatory materials that have been acquired (superimposition information that is superimposed onto the video image) overlaps with a human body region of a human body performing an explanatory action transparent (changes the transparency). In addition, this is a processing system in which the explanatory materials for which the transparency has been changed are then superimposed onto the video image information (video image captured of the human body), and the superimposed video image, which is the video image in which this superimposition has been performed, is displayed on a monitor.

The automatic image capturing system A1000 is configured so as to have a video image acquisition apparatus A1001, a materials acquisition apparatus A1002, an image superimposing apparatus A1003, and a monitor apparatus A1013. The image superimposing apparatus A1003 is communicably connected with the video image acquisition apparatus A1001, the material acquisition apparatus A1002, and the monitor apparatus A1013. In addition, the image superimposing apparatus A1003 and the monitor apparatus A1013 are connected via a circuit such as a video interface or the like.

The video image acquisition apparatus A1001 is an apparatus that acquires an image by capturing images of the surroundings of the video image acquisition apparatus A1001, and generates a captured video image from a plurality of images that have been captured. This is configured by an image capturing apparatus, such as a camera or the like. The video image acquisition apparatus A1001 has an image capturing unit that is not shown, and this image capturing unit is configured to include a lens unit for forming an image from light, an image capturing element that performs analog signal conversion according to the light that has been image formed, and a signal processing unit.

The image capturing unit acquires images by performing image capturing on an image capturing target. The video image acquisition unit A1001 outputs the video image information that has been generated from the plurality of images that have been captured to the image superimposing apparatus A1003.

The materials acquisition apparatus A1002 is an apparatus that acquires explanatory materials such as presentation materials that were created using Microsoft PowerPoint or the like, Adobe PDFs, or the like using electronic data. The materials acquisition apparatus A1002 outputs the explanatory materials that have been acquired to the image superimposing apparatus A1003.

Note that the explanatory materials may be any kind of materials as long as they are images or information to be superimposed onto the video image. For example, the explanatory materials may be text information. That is, it is sufficient if the explanatory materials are predetermined superimposition information that will be superimposed onto a video image. In this context, the predetermined superimposition information may be an image or text, or it may also be a symbol, an icon, or the like other than this.

For example, the explanatory materials are used by the human body that is included in the video image. The human body that is included in the video image is able to explain the contents of the predetermined superimposition information while watching the video image onto which this superimposition information has been superimposed via a monitor or the like.

The image superimposing apparatus A1003 detects a human body from a video image that has been input from the video image acquisition apparatus A1001 and determines whether or not that human body is performing an explanatory action. In addition, in a case in which the human body was performing an explanatory action, the region in the explanatory materials that overlaps with the region of the human body is made transparent and then superimposed onto the video image information. In addition, the video image in which this has been superimposed is output to the monitor apparatus A1013.

The image superimposing apparatus A1003 is configured so as to have a video image acquisition unit A1004, a materials acquisition unit A1005, a skeleton information estimating unit A1006, a human body action determining unit A1007, a region division processing unit A1008, and an overlapping region extraction unit A1009 as functional units.

Furthermore, the image superimposing apparatus A1003 is configured to have a transparency changing unit A1010, an image superimposing unit A1011, and a video image output unit A1012 as functional units. Each of these functional units is realized by a CPU 11, which will be explained below, decompressing a program that has been stored on a ROM 12 onto a RAM 13 and executing this. In addition, the CPU 11 stores the execution results of each processing explained below on the RAM 13 or a predetermined storage medium.

The video image acquisition unit A1004 acquires video image information. Specifically, the video image acquisition unit A1004 acquires video image information that has been input from the video image acquisition apparatus A1001. However, this is not limited thereto, and the video image acquisition unit A1004 may also acquire video image information from a device, a server, or the like other than the video image acquisition apparatus A1001. The video image acquisition unit A1004 outputs the video image information that has been acquired to the skeleton information estimating unit A1006 and the region division processing unit A1008.

The skeleton information estimating unit A1006 estimates skeleton information for a human body. Specifically, the skeleton information estimating unit A1006 detects a human body from the video image information that has been input from the video image acquisition unit A1004, and estimates skeleton information, which is the information for the skeleton of that human body.

The skeleton information estimating unit A1006 detects a human body from images that are included in the video image information (based on the images), and estimates the skeleton information for the human body that has been detected. When estimating the skeleton information for a human body, the skeleton information estimating unit A1006 cuts out the coordinates for the human body in the video image information, and estimates the skeleton information for the human body by using a skeleton estimating technology on these.

After this, the skeleton information estimating unit A1006 outputs the video image information and the skeleton information for the human body that has been estimated to the human body action determining unit A1007 to serve as skeleton estimation results. In the present embodiment, the skeleton information estimating unit A1006 estimates the skeleton for the human body that was detected, and outputs the skeleton estimation results.

In recent years, a large number of skeleton estimating technologies that use Deep Learning have entered the market, and it is becoming possible to estimate the skeleton of a human body with a high degree of precision. From among these, there are also technologies that are provided on OSS (open-source software), such as OpenPose, DeepPose, and the like, and it is becoming easier to perform skeleton estimation.

Limitations to the skeleton estimating technology are not made in the First Embodiment. However, it is assumed that one from among the above skeleton estimating technologies that use Deep Learning is used.

The human body action determining unit A1007 determines whether or not the human body is performing a predetermined action. Specifically, the human body action determining unit A1007 determines whether or not a human body is performing an explanatory action that serves as the predetermined action by using the skeleton information for the human body, which is the estimation results that have been acquired from the skeleton information estimating unit A1006.

In a case in which the human body action determining unit A1007 has determined that the human body has performed an explanatory action, these determination results, the video image information, and the skeleton estimation results are output to the overlapping region extracting unit A1009. In contrast, in a case in which it has been determined that the human body is not performing an explanatory action, these determination results and the video image information are output to the image superimposing unit A1011.

Below, the determination processing that is performed by the human body action determining unit A1007 will be explained using FIG. 3 and FIG. 4. In the present embodiment, the human body action determining unit A1007 determines whether or not the human body is performing a predetermined action, and also functions as a first determining unit that outputs a determination result.

Figure 3:
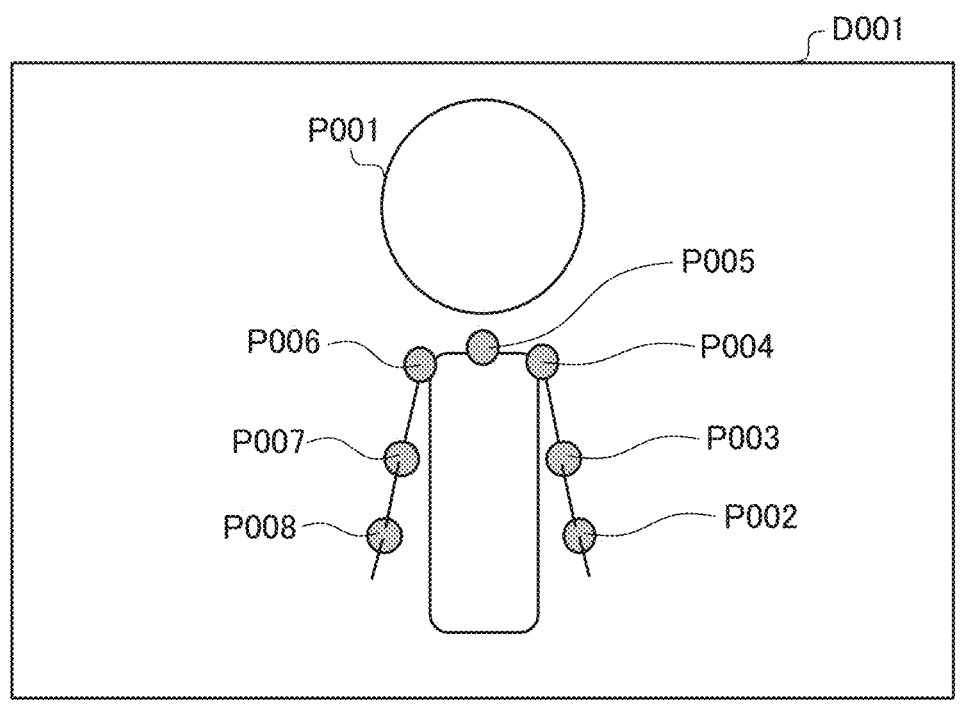
FIG. 3 is a diagram explaining skeleton estimation results for a human body according to the First Embodiment.

FIG. 3 is a diagram showing the skeleton information for the shoulder, arm, and neck, which are necessary for determining an explanatory action, from among the skeleton estimation results for the human body that have been acquired from the human body action determining unit A1007. D001 shows the video image information. P001 shows the human body. P002 shows the left hand, P003 shows the left elbow, and P004 shows the left shoulder. P005 shows the neck. P006 shows the right shoulder, P007 shows the right elbow, and P008 shows the right hand.

Figure 4:
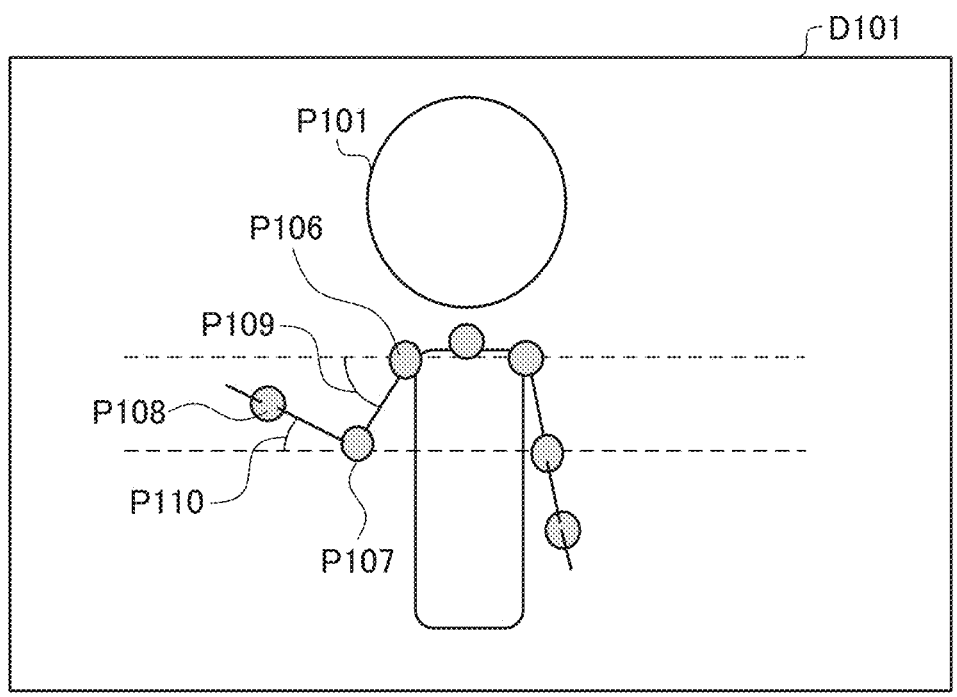
FIG. 4 is a diagram explaining a determination method for an explanatory action of a human body using skeleton estimation results for the human body according to the First Embodiment.

FIG. 4 is a diagram explaining a state when the explanatory action is being determined by the right arm of the human body. D101 shows the video image information. P101 shows the human body. P106 shows the right shoulder, P107 shows the right elbow, and P108 show the right hand. The angle made by the right shoulder P106 and the right elbow P107 is made P109. In addition, the angle made by the right elbow P107 and the right hand P108 is made P110.

The human body action determining unit A1007 is able to determine that an explanatory action is being performed when, for example, P108 and P109 are greater than 0° and less than 90°. Note that this is merely one example, and therefore, any method is sufficient as long as it is possible to determine an explanatory action by using the skeleton information.

For example, it may also be determined that an explanatory action is being performed when one of P108 or P109 is greater than 0° and less than 90°. In addition, for example, it may also be determined that an explanatory action is being performed in a case in which an action has been performed in which the body and neck have been rotated by a predetermined amount, in a case in which an action has been performed in which both hands are spread out or are holding the chest, in a case in which an action has been performed in which a finger is raised, or the like.

The region division processing unit A1008 extracts a human body and a person region from within an image. Specifically, the region division processing unit A1008 performs region division processing using the video image information that has been input from the video image acquisition unit A1004, and obtains the information for the human body, the person region, and the category, or the like. The region division processing unit A1008 functions as a first extraction unit that extracts a human body region from images that are included in a video image (based on the images).

The region division processing unit A1008 outputs the information for the human body, the person region, and the category that have been acquired to the overlapping region extraction unit A1009 to serve as region information. Note that various methods are known for the region division processing that is performed by the region division processing unit A1008, such as region split, super parsing, fully CNN (convolution neural network) using deep learning, or the like.

Fully CNN is able to perform region division with a high degree of precision, and it is therefore assumed that this is used in the First Embodiment. However, any method may be used. Region split, super parsing, fully CNN, and the like are well-known technologies, and therefore detailed explanations thereof will be omitted.

The overlapping region extracting unit A1009 extracts an overlapping region from the explanatory materials. Specifically, the overlapping region extraction unit A1009 extracts an overlapping region from the explanatory materials using the determination results for the action of the human body that have been input from the human body action determining unit A1007, the skeleton estimation results, the region information that has been input from the region division processing unit A1008, and the explanatory materials that have been input from the materials acquisition unit A1005.

Note that the overlapping region extracting unit A1009 extracts an overlapping region in a case in which the determination results that have been input from the human body action determining unit A1007 were results in which it was determined that an explanatory action is being performed. The overlapping region is a region in the explanatory materials that overlaps with the region information for the human body that is performing the explanatory action from among the region information. The overlapping region extracting unit A1009 outputs the overlapping region that has been extracted, the explanatory materials, and the video image information to the transparency changing unit A1010.

In the present embodiment, the overlapping region extracting unit A1009 also functions as a second extracting unit configured to extract a region of the explanatory materials that overlaps with the region of the human body to serve as an overlapping region based on the determination results for an action of the human body, the region of the human body, and the explanatory materials.

In addition, the overlapping region extracting unit A1009 may also combine the region information that includes the region of the human body and the skeleton estimating results, and extract a partial region of the human body, such as a face, and arm, or the like, to serve as the overlapping region. In addition, the overlapping region extracting unit A1009 may also extract an overlapping region in the human body in a case in which the determination results are results in which it has been determined that an explanatory action is not being performed.

The transparency changing unit A1010 changes the transparency of at least a portion the explanatory materials. Specifically, the transparency changing unit A1010 changes the transparency of the region of the explanatory materials that has been input from the overlapping region extracting unit, which overlaps with the region of the human body, that is, it changes the transparency of the overlapping region such that the transparency thereof increases.

Note that the transparency changing unit A1010 may also be made so as to, for example, change the transparency of the entirety of the explanatory materials, or it may also be made so as to change the transparency of a portion of the explanatory materials without any figures, characters, or the like, a so-called blank space. In addition, it may also be made such that the degree of transparency changes with the passage of time.

In addition, in relation to the transparency, this may be made any degree of transparency, from semi-transparent, to completely transparent, or the like. The transparency changing unit A1010 outputs the explanatory materials for which the transparency has been changed and the video image information to the image superimposing unit A1011. In the present embodiment, the transparency changing unit A1010 changes the transparency of at least a portion of the explanatory materials according to the overlapping region such that the transparency thereof increases.

The image superimposing unit A1011 superimposes the explanatory materials onto the video image information. Specifically, in a case in which explanatory materials for which the transparency has been changed and video image information have been input from the transparency changing unit A1010, the image superimposing unit A1011 superimposes the explanatory materials for which the transparency has been changed onto the video image information.

In addition, in a case in which explanatory materials for which the transparency has been changed have not been input from the transparency changing unit A1010, the image superimposing unit A1011 superimposes the explanatory materials for which the transparency has not been changed (the explanatory materials that have been input from the materials acquisition unit A1005) onto the video image information.

That is, in a case in which the transparency has been changed, and in a case in which it has not been, the image superimposing unit A1011 performs processing to superimpose explanatory materials with a different degree of transparency onto an image from among the video information, and generates a superimposed image. The image superimposing unit A1011 outputs the video image in which these explanatory materials have been superimposed to the video image output unit A1012 to serve as a superimposed image.

The video image output unit A1012 outputs the information for the video image and the image. Specifically, the video image output unit A1012 outputs the superimposed video image that has been input from the image superimposing unit A1011 to the monitor apparatus A1013. In the present embodiment, the video image output unit 1012 also functions as a display control unit configured to display a superimposed video image configured of superimposed images on a screen of the monitor apparatus A1013.

The monitor apparatus A1013 is a display apparatus configured to display a superimposed video image that has been input from the video image output unit A1012 on a screen.

One example of a state in which the image superimposing unit A1011 superimposes explanatory materials onto video image information will be explained below in reference to FIG. 5A to FIG. 9B. FIG. 5A to FIG. 9B are figures explaining a state in which a region that overlaps with a human body is not made transparent in a case in which the human body is not performing an explanatory action.

Figure 5A:
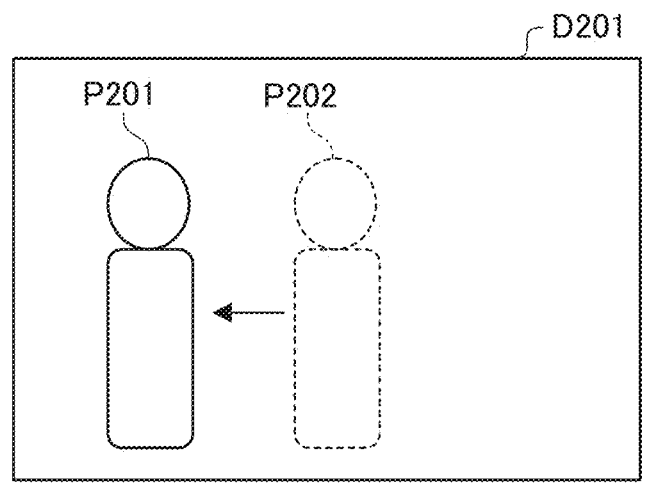
FIGS. 5A and 5B are diagrams explaining a state in which explanatory materials have been superimposed onto a video image captured of a human body when the human body is not performing an explanatory action according to the First Embodiment.
Figure 5B:
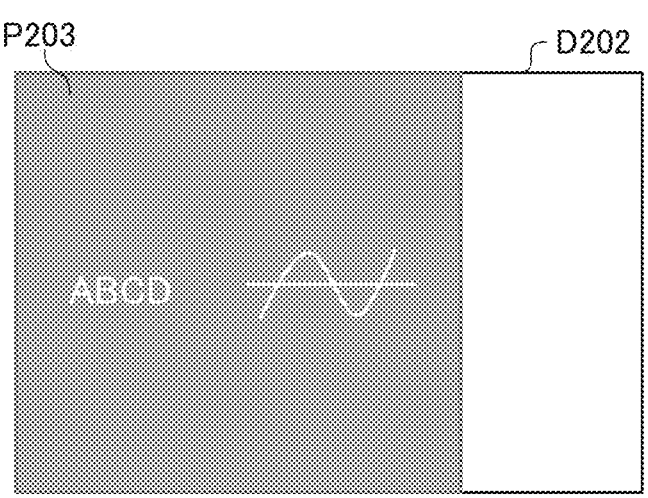
Figure 9A:
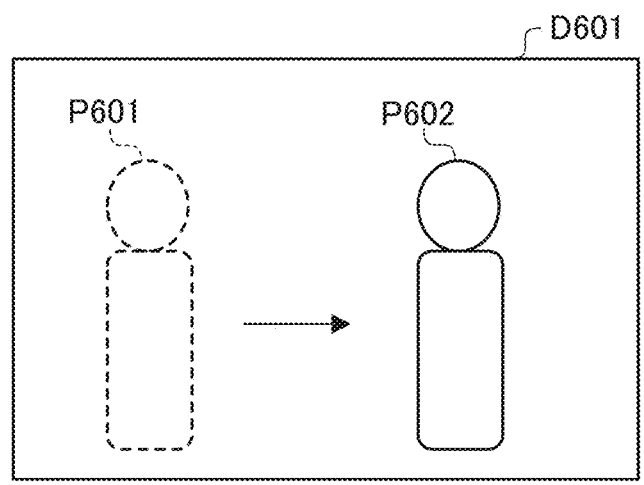
FIGS. 9A and 9B are diagrams explaining a state in which explanatory materials have been superimposed onto a video image captured of a human body when the human body is not performing an explanatory action according to the First Embodiment.
Figure 9B:
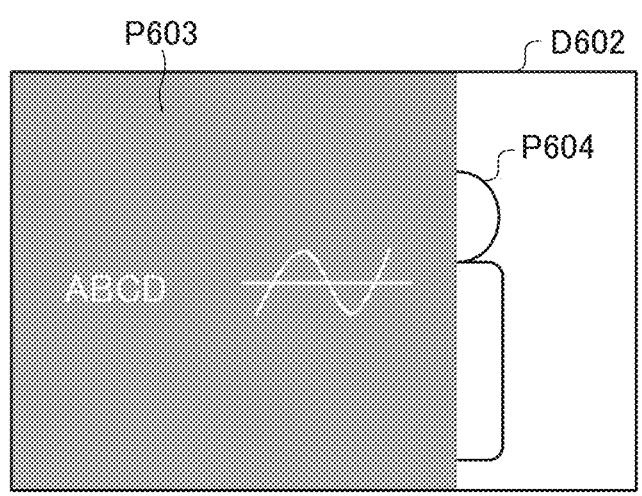

FIG. 5A and FIG. 9A are images showing examples of video images that have been captured of a human body. FIG. 5B and FIG. 9B are diagrams showing a state in which explanatory materials have been superimposed onto the video image information. In FIGS. 5A-B and FIGS. 9A-B, states are shown in which the image superimposing unit A1011 is superimposing explanatory materials for which the transparency has not been changed onto the video image information.

In FIGS. 5A-B, D201 shows a video image that has been captured of a human body, and D202 shows a video image (a superimposed video image) in which the explanatory materials have been superimposed onto D201. P203 shows the explanatory materials. P202 shows the human body before it moves, and P201 shows the human body after it has moved. In the video image D201, the human body has only moved, it has not performed an explanatory action, and therefore, the image superimposing unit A1011 superimposes explanatory materials for which the transparency has not been changed onto the video image that has been captured of the human body.

Therefore, in the superimposed video image D202, the region for the explanatory materials P203 that overlaps with the human body region is not made transparent.

In FIGS. 9A-B, D601 shows a video image that has been captured of a human body, and D602 shows a video image (a superimposed video image) in which explanatory materials have been superimposed onto D601. P603 shows the explanatory materials. P601, P602, and P604 each show the human body. Specifically, P601 shows the human body before it moves, P602 shows the human body after it has moved, and P604 shows the human body on which the explanatory materials P603 have been superimposed in D602.

In the video image D601, the human body has only moved, it is not performing an explanatory action, and therefore, the image superimposing unit A1011 superimposes explanatory materials for which the transparency has not been changed onto the video image that has been captured of the human body. Therefore, in the superimposed video image D602, the region of the explanatory materials P603 that overlaps with the human body region in this superimposed video image has not been made transparent.

Figure 6A:
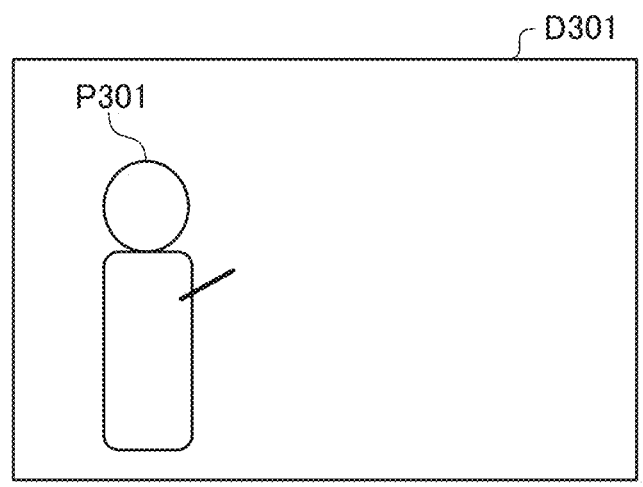
FIGS. 6A and 6B are diagrams explaining a state in which explanatory materials in which a region that overlaps with the human body region has been made transparent have been superimposed onto a video image captured of a human body when the human body is performing an explanatory gesture according to the First Embodiment.
Figure 6B:
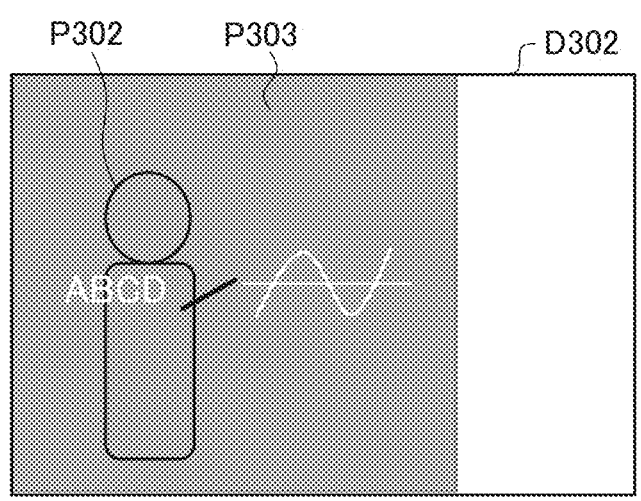

FIGS. 6A-B are diagrams explaining a state in which a region that overlaps with the human body has been made transparent in a case in which the human body has performed an explanatory action. That is, in FIGS. 6A-B, a state is shown in which the image superimposing unit A1011 has superimposed explanatory materials for which the transparency has been changed onto the video image information. FIG. 6A is a diagram showing an example of a video image that has been captured of a human body. FIG. 6B is a diagram showing a state in which explanatory materials have been superimposed onto the video image information.

In FIGS. 6A-B, D301 shows a video image that has been captured of a human body, and D302 shows a video image (a superimposed video image) in which explanatory materials have been superimposed onto D301. P301 and P302 show a human body. P303 shows the explanatory materials.

The human body P301 that is shown in FIG. 6A is performing an explanatory action, and therefore, the image superimposing unit A1011 superimposes explanatory materials for which the transparency has been changed onto the video image that has been captured of the human body. Therefore, in the superimposed video image D302, the region (the superimposition region) of the explanatory materials P303 that overlaps with the human body P302 is made transparent, and it is possible to see what part of the explanatory materials the human body P301 is explaining.

Figure 7A:
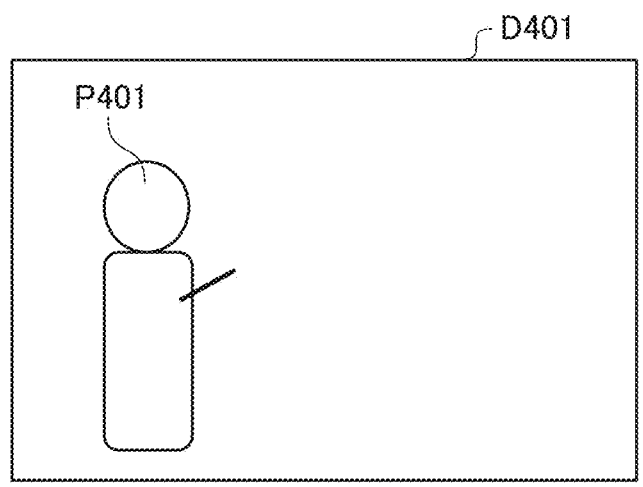
FIGS. 7A and 7B are diagrams explaining a state in which explanatory materials in which a region that overlaps with a region for an arm of a human body who is giving an explanation has been made transparent are superimposed onto a video image that is captured of the human body when the human body is performing an explanatory action according to the First Embodiment.
Figure 7B:
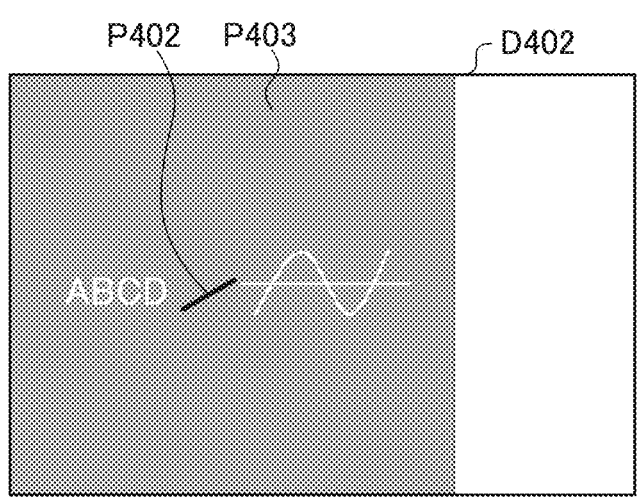
Figure 8A:
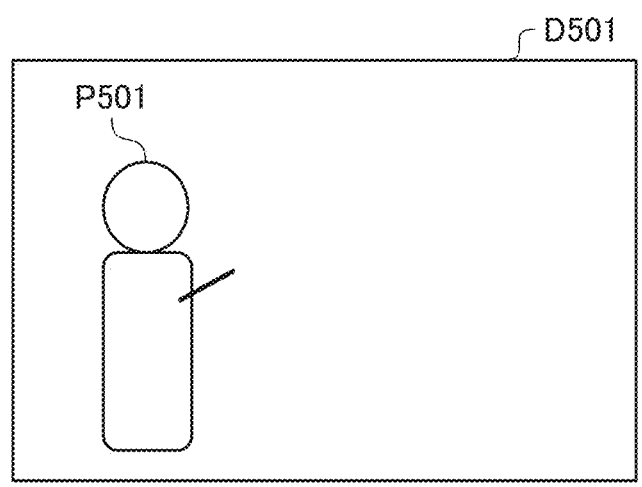
FIGS. 8A and 8B are diagrams explaining a state in which explanatory materials in which a region that overlaps with a region of a human body's face has been made transparent is superimposed onto a video image captured of the human body when the human body is performing an explanatory action according to the First Embodiment.
Figure 8B:
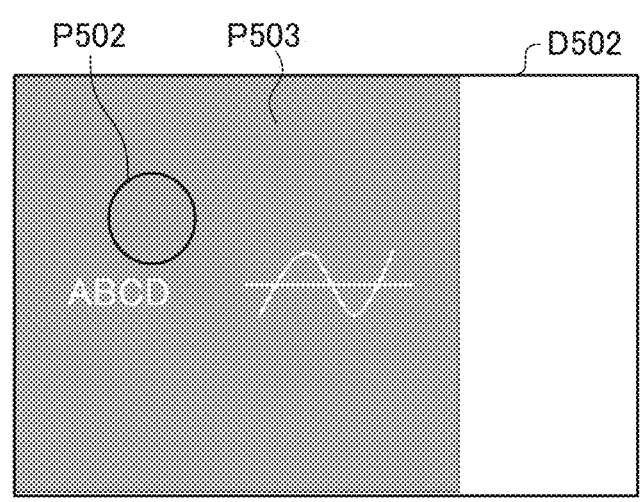

FIGS. 7A-B and FIGS. 8A-B are diagrams explaining states in which a region that overlaps with a portion of a human body has been made transparent in a case in which the human body was performing an explanatory action. FIG. 7A and FIG. 8A are diagrams showing examples of video images that have been captured of a human body. FIG. 7B and FIG. 8B are diagrams showing states in which explanatory materials have been superimposed onto the video image information. FIGS. 7A-B and FIGS. 8A-B show states in which the image superimposing unit A1011 superimposes explanatory materials for which the transparency has been changed onto the video information.

In FIGS. 7A-B, D401 shows a video image that has been captured of a human body, and D402 shows a video image (a superimposed video image) in which explanatory materials have been superimposed onto D401. P401 shows the human body. P402 shows an arm that is used in the explanation.

P403 shows the explanatory materials. The human body P401 that is shown in FIG. 7A is performing an explanatory action and therefore, the image superimposing unit A1011 superimposes explanatory materials for which the transparency has been changed onto the video image that has been captured of the human body. Due to this, in the superimposed video image D402, the region (the superimposition region) of the explanatory materials P403 that overlaps with the region of the arm P402 of the human body P401 that is used in the explanation is made transparent, and it is possible to confirm what part of the explanatory materials the human body P401 is explaining.

In FIGS. 8A-B, D501 shows a video image that has been captured of a human body, and D502 shows a video image (a superimposed video image) in which explanatory materials have been superimposed onto D501. P501 shows the human body. P502 shows the head of the human body. P503 shows the explanatory materials.

The human body P501 that is shown in FIG. 8A is performing an explanatory action, and therefore, the image superimposing unit A1011 superimposes explanatory materials for which the transparency has been changed onto the video image that has been captured of the human body. Therefore, in the superimposed video image D502, the region (the superimposition region) of the explanatory materials P503 that overlaps with the region of the head P502 of the human body P501 is made transparent, and it is possible to confirm what part the human body P501 is explaining.

By making overlapping regions, which are regions that overlap with a human body that is performing an explanatory action, transparent only in cases in which the human body has performed an explanatory action in such a manner, it is possible to confirm on a screen what part of the explanatory materials the human body is explaining when the human body is giving an explanation. Furthermore, in a case in which the human body is not giving an explanation, it is possible to confirm the entirety of the explanatory materials on the screen.

Figure 2:
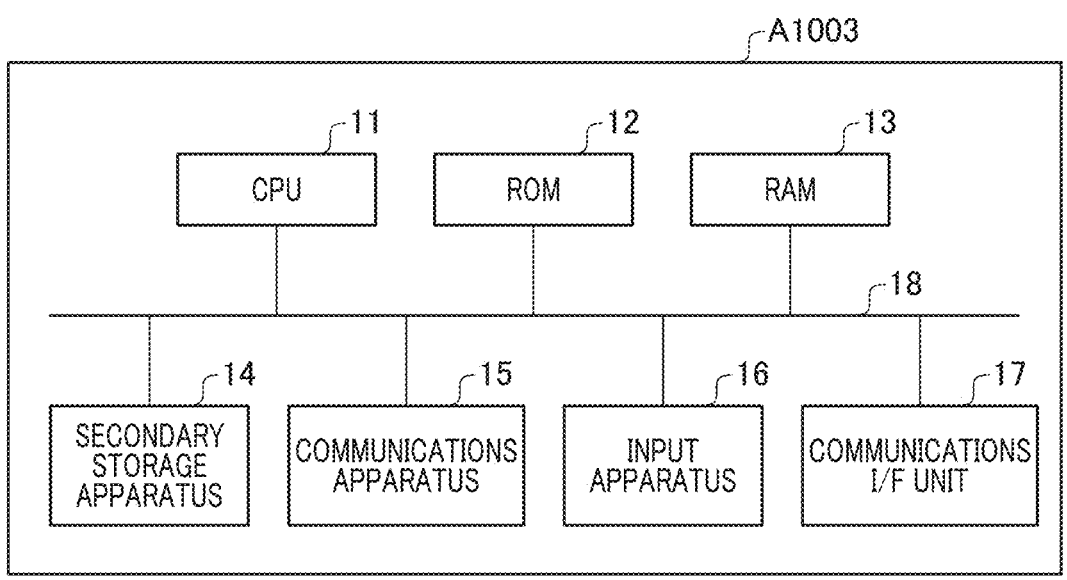
FIG. 2 is a configuration block diagram of an image superimposing apparatus according to the First Embodiment.

FIG. 2 is a diagram showing one example of a hardware configuration of the image superimposing apparatus A1003. As is shown in FIG. 2, the image superimposing apparatus A1003 is configured by the CPU 11, the ROM 12, the RAM 13, a secondary storage apparatus 14, a communications apparatus 15, an input apparatus 16, a communications I/F unit 17, and a connecting bus 18.

The CPU (processor) 11 is a central processing apparatus, and the control of the automatic image capturing system A1000 that comprises the image superimposing apparatus A1003 is performed by the CPU 11 executing a control program that has been stored on the ROM 12 or the RAM 13. That is, the CPU 11 integrally controls each configurational element of the automatic image capturing system A1000 that comprises the image superimposing apparatus A1003. CPU is an abbreviation of Central Processing Unit.

The ROM 12 is a nonvolatile memory, and stores a control program, and each type of parameter. The control program is executed by the CPU 11 and realizes each processing performed by the image superimposing apparatus A1003 that will be described below. The RAM 13 is a nonvolatile memory, and temporarily stores images and video images, a control program, the execution results thereof, and the like.

The secondary storage apparatus 14 is a rewritable secondary storage apparatus, such as a hard disk, a flash drive, or the like, and stores data that has been received via the communications apparatus 15. In addition, it also stores a control program, each type of settings contents, processing results, and the like. This information is output to the RAM 13 and is used in the execution of the program by the CPU 11.

The communications unit 15 is a wired communications unit and performs communication with each type of apparatus. Note that the communications unit 15 is not limited to a wired communications unit and may also be a wireless communications unit. The input apparatus 16 is mouse, a keyboard, a touch-panel style display, or the like that receives inputs from a user.

The communications I/F unit 17 is an interface for connecting to a removable device and includes, for example, an installation mechanism, such as a power source and a removable socket, for removing a removable device, or the like. The image superimposing apparatus A1003 performs data communications with the removable device via the communications I/F unit 17.

The connecting bus 18 connects the CPU 11, the ROM 12, the RAM 13, the secondary storage apparatus 14, the communications apparatus 15, the input apparatus 16, and the communications I/F unit 17 that configure the image superimposing apparatus A1003, and performs data communications therebetween.

In the present embodiment, the processing in each functional unit is realized by software using the CPU 11 of the image superimposing apparatus A1003. However, it may also be made such that a portion or the entirety of the processing for the image superimposing apparatus A1003 is realized by hardware. An application-specific integrated circuit (ASIC), a processor (a reconfigurable processor, a DSP) or the like can be used as this hardware.

Figure 10:
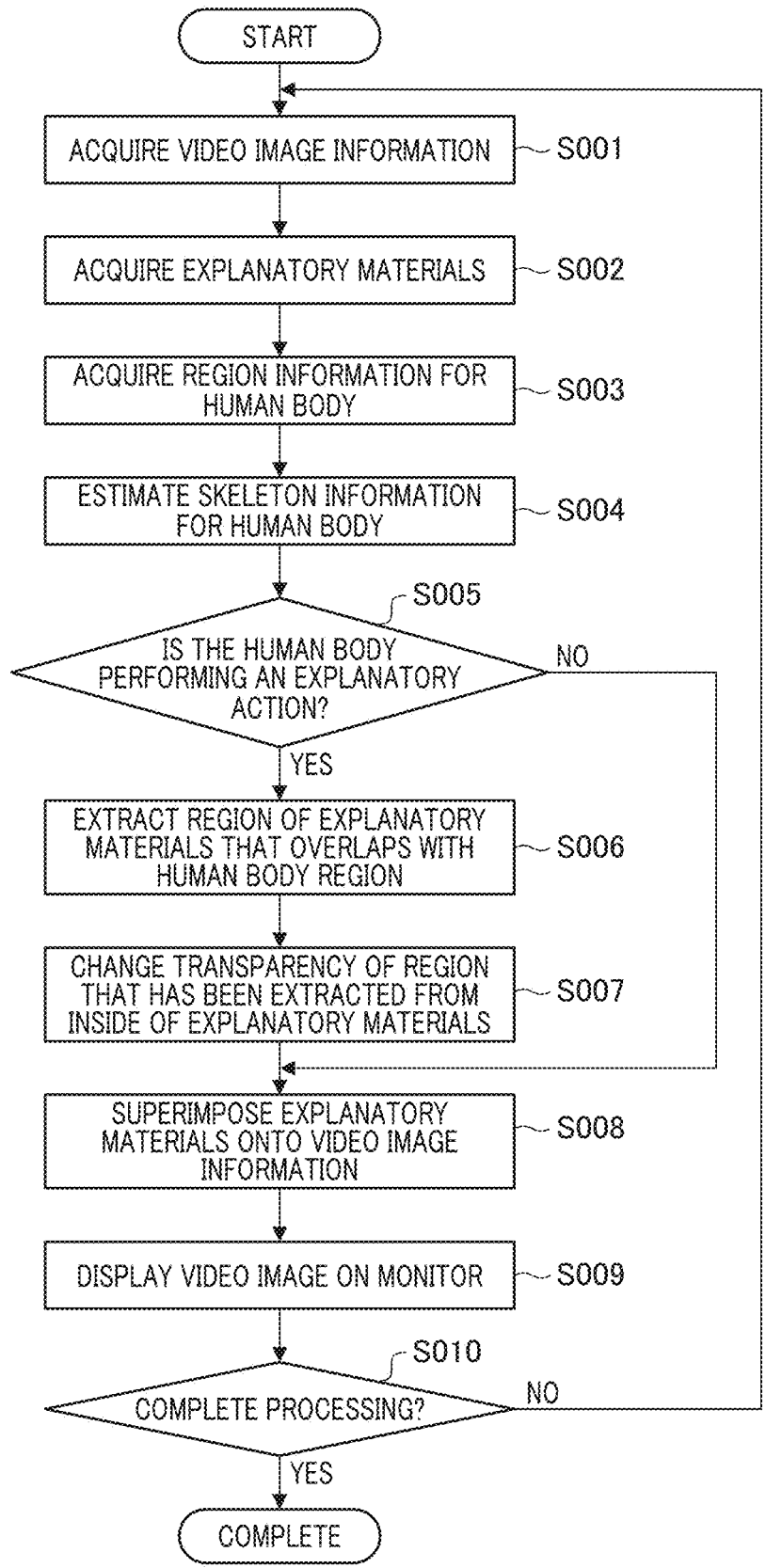
FIG. 10 is a flowchart showing processing procedures for an automatic image capturing system according to the First Embodiment.

In this context, the processing procedures for the automatic image capturing system A1000 according to the First Embodiment will be explained with reference to the flowchart in FIG. 10. FIG. 10 is a flowchart showing the processing procedures for the automatic image capturing system A1000 according to the First Embodiment. Each processing below is realized by the CPU 11 of the image superimposing apparatus A1003 executing a program that has been stored on the ROM 12 or the like.

In addition, the expression of the processes (steps) is shortened by expressing each process (step) by attaching "S" to the front thereof. The automatic image capturing system begins upon the automatic image capturing system A1000 being started up by a user operation via the input apparatus 16 or the like.

First, in S001, the video image acquisition unit A1004 acquires the video image information from the video image acquisition apparatus A1001. After this, the processing proceeds to S002.

Next, during S002, the materials acquisition unit A1005 acquires the explanatory materials from the materials acquisition apparatus A1002. After the acquisition of the explanatory materials, the materials acquisition unit A1005 outputs the explanatory materials that have been acquired to the overlapping region extracting unit A1009 and the image superimposing unit A1011. After this, the processing proceeds to S003.

Next, during S003, the region division processing unit A1008 performs region division processing using video image information that has been acquired from the video image acquisition unit A1004 (a first extraction process). In addition, the region division processing unit A1008 outputs the region information that has been divided to the overlapping region extracting unit A1009. After this, the processing proceeds to S004.

Next, during S004, the skeleton information estimating unit A1006 estimates skeleton information for the human body using video image information that has been acquired from the video image acquisition unit A1004. The skeleton information estimating unit A1006 outputs the skeleton information that has been estimated to the human body action determining unit A1007 to serve as skeleton estimation results. After this, the processing proceeds to S005.

Next, during S005, the human body action determining unit A1007 estimates an action of the human body using the skeleton estimation results for the human body that have been acquired from the skeleton information estimating unit A1006, and determines whether or not this is an explanatory action (a first determination process).

In a case in which the result of the determination is that this was an explanatory action (YES during S005), the human body action determining unit A1007 outputs the results that have been determined and the skeleton estimation results to the overlapping region extraction unit A1009. After this, the processing proceeds to S006. In contrast, in a case in which this was not an explanatory action (NO during S005), the result that has been determined is output to the image superimposing unit A1011. After this, the processing proceeds to S008.

Next, during S006, the overlapping region extracting unit A1009 extracts the region in the explanatory materials that overlaps with the human body that performed the explanatory action (a second extraction process).

Specifically, a region in the explanatory materials that overlaps with the human body that has performed the explanatory action is extracted based on the determination results and the skeleton estimation results that have been input from the human body action determining unit A1007, the region information for the human body that has been input from the region division processing unit A1008, and the explanatory materials that have been input from the materials acquisition unit A1005. The overlapping region extraction unit A1009 outputs the region that has been extracted (the overlapping region) and the explanatory materials to the transparency changing unit A1010. After this, the processing proceeds to S007.

Next, during S007, the transparency changing unit A1010 changes the transparency of the explanatory materials according to the overlapping region that has been input from the overlapping region extraction unit A1009 (a changing process). Specifically, this is changed such that the transparency is increased in the superimposition region. That is, the transparency is changed so that both the explanatory materials and the human body can be viewed even if the both are overlapped. In addition, the transparency changing unit A1010 outputs the explanatory materials for which the transparency has been changed to the image superimposing unit A1011. After this, the processing proceeds to S008.

Next, during S008, the image superimposing unit A1011 superimposes the explanatory materials onto the video image information (a superimposition process). In this context, in a case in which determination results that the human body is not performing an explanatory action have been acquired from the human body action determining unit A1007, the explanatory materials that have been acquired from the materials acquisition unit A1005 are superimposed onto the video image information that has been acquired from the human body action determining unit A1007.

In contrast, in a case in which explanatory materials for which the transparency has been changed have been acquired from the transparency changing unit A1010, the explanatory materials for which the transparency has been changed are superimposed onto the video image information that has been input from the transparency changing unit A1010. The image superimposing unit A1011 outputs the video image onto which this has been superimposed (the superimposed video image) to the video image output unit A1012. After this, the processing proceeds to S009.

Next, during S009, the video image output unit A1012 outputs the video image information (the superimposed video image) that has been input from the image superimposing unit A1011 to the monitor apparatus A1013. In a case in which this video image information has been input from the video image output unit A1012, the monitor apparatus A1013 displays video images or images from this video image information on a screen. After this, the processing proceeds to S010.

Next, during S010, whether or not to complete the processing is determined. Specifically, it is identified whether or not an On/Off switch of the automatic image capturing system, which is not shown, has been operated and a stopping operation for the automatic image capturing processing has been performed.

In a case in which the determination result is that a stopping operation for the automatic image capturing processing has not been performed (NO in S010), the processing proceeds to S001, and the same processing is repeated. In contrast, in a case in which a stopping operating for the automatic image capturing has been performed (YES in S010), the automatic image capturing is completed, and the flow of the present processing is completed.

As was explained above, when the automatic image capturing system A1000 in the First Embodiment superimposes explanatory materials onto video image information, it is possible to change the transparency of a region of the explanatory materials that overlaps with the human body region when the human body is performing an explanatory action. It is thereby possible to see on the screen what part of the explanatory materials the human body is explaining when the human body performs an explanatory action.

In addition, when the human body is not performing an explanatory action, it is possible to see the entirety of the explanatory materials on the screen. Therefore, a viewer who is looking at the explanatory materials can see the explanatory materials in a manner in which they are easy to understand.

Second Embodiment

Figure 11:
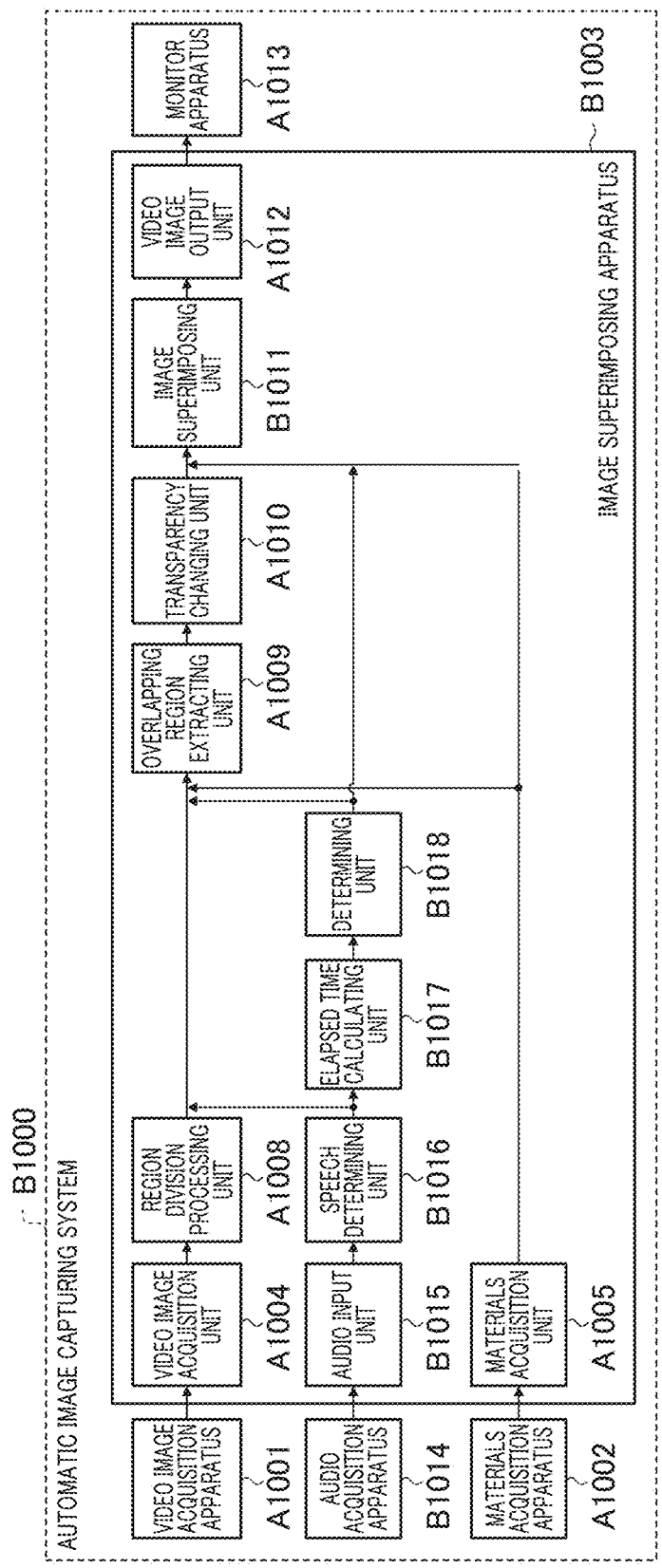
FIG. 11 is a configurational block diagram of an automatic image capturing system according to a Second Embodiment.

A configurational example of an image superimposing apparatus B1003 according to the Second Embodiment will be explained with reference to FIG. 11. FIG. 11 is a block diagram showing the configurational elements of an automatic image capturing system B1000 that comprises the image superimposing apparatus B1003 according to the Second Embodiment.

Note that below, detailed explanations of the configurations of apparatuses and functional elements that are the same as the configurations of the apparatuses and functional elements in the automatic image capturing system A1000 in the First Embodiment, or the like will be omitted. In addition, the hardware configuration is the same as the hardware configuration for the automatic image capturing system A1000 in the First Embodiment and therefore, an explanation thereof will be omitted.

The automatic image capturing system B1000 detects a human body from a captured video image, and determines if the human body is speaking from audio information that has been acquired from a microphone. In addition, in a case in which they are speaking, it is assumed that the human body is performing a verbal explanation, and the region of the explanatory materials that have been acquired that overlaps with the region for the human body that is giving the explanation (the overlapping region) is made transparent (the transparency is changed), and this is superimposed onto the video image information (the video image captured of the human body). In addition, this is a processing system that displays the superimposed video image, which is a video image onto which the explanatory materials have been superimposed, on a monitor.

The automatic image capturing system B1000 is configured so as to have a video image acquisition apparatus A1001, a materials acquisition apparatus A1002, an image superimposing apparatus B1003, a monitor apparatus A1013, and an audio acquisition apparatus B1014.

The image superimposing apparatus B1003 is communicably connected to the video image acquisition apparatus A1001, the materials acquisition apparatus A1002, the monitor apparatus A1013, and the audio acquisition apparatus B1014. The image superimposing apparatus B1003 and the monitor apparatus A1013 are connected via a circuit, such as a video interface or the like.

The image superimposing apparatus B1003 acquires region information for the human body from the video image that has been input from the video image acquisition apparatus A1001, and determines whether or not the human body is speaking from the audio information that has been input from the audio acquisition apparatus B1014.

In addition, in a case in which the human body is speaking, it is assumed that the human body is giving a verbal explanation, and the region in the explanatory materials that overlaps with the human body region is made transparent and superimposed onto the video image information. Note that the image superimposing apparatus B1003 assumes that the explanation continues for a fixed period (a predetermined period) after the speaking has finished and continues to the make the region in the explanatory materials that overlaps with the human body region transparent. After this, the image superimposing apparatus B1003 outputs the superimposed video image, which is the video image in which this has been superimposed, to the monitor apparatus A1013.

The image superimposing apparatus B1003 is configured to have the video image acquisition unit A1004, the materials acquisition unit A1005, the region division processing unit A1008, the overlapping region extracting unit A1009, the transparency changing unit A1010, and an image superimposing unit B1011 as functional units.

Furthermore, the image superimposing apparatus B1003 is configured to have the video image output unit A1012, an audio input unit B1015, a speech determining unit B1016, an elapsed time calculating unit B1017, and a determining unit B1018 as functional units.

These functional units are realized by the CPU 11 decompressing a program that has been stored on the ROM 12 onto the RAM 13 and executing it in the same manner as in the First Embodiment. In addition, the CPU 11 stores the execution results of each processing to be explained below on the RAM 13 or a predetermined storage medium.

The audio acquisition apparatus B1014 is an apparatus that collects sounds from around the audio acquisition apparatus B1014 using a microphone and generates audio information. The audio acquisition apparatus B1014 outputs the audio information that has been generated to the audio input unit B1015.

The audio input unit B1015 inputs the audio information that has been generated by the audio acquisition unit B1014. The audio input unit B1015 outputs the audio information to the speech determining unit B1016 to serve as audio information (audio data).

The speech determining unit B1016 determines whether or not the audio information that has been input from the audio input unit B1015 is speech. When performing the determination, the speech determining unit B1016 determines that this is a verbal explanation in the case in which there is speech.

It is assumed that the determination of whether or not there is speech uses a voice segment detection (Voice Activity Detection: VAD) that determines audio segments and other segments from among the audio data, which includes voices and other sounds. Note that voice segment detection is a well-known technology, and therefore a detailed explanation thereof will be omitted.

The speech determining unit B1016 performs voice segment detection on the audio data, and determines that there is speech if an audio segment is present. In the present embodiment, the speech determining unit B1016 also functions as a second determination unit that determines whether or not a human body is speaking based on audio information.

In a case in which the speech determining unit B1016 has determined that there is speech, first information, which is information that the human body is giving a verbal explanation, is output to the overlapping region extracting unit A1009. In contrast, in a case in which there is no speech, second information, which is information that the human body is not speaking, is output to the elapsed time calculating unit B1017.

The elapsed time calculating unit B1017 calculates the time that has elapsed after the human body has stopped speaking. Specifically, the elapsed time calculating unit B1017 calculates the time that has elapsed from when the human body stopped speaking based on the second information that has been input from the speech determining unit B1016. Note that in a case in which the second information has not been input to the elapsed time calculating unit B1017, the time calculation is completed.

The elapsed time calculating unit B1017 outputs the elapsed time from when the speech was completed that was calculated to the determining unit B1018 to serve as calculated time (the elapsed time after the speech has been completed). In the present embodiment, the elapsed time calculating unit B1017 calculates the time from when the human body stopped speaking based on the second information, and outputs the calculated time.

The determining unit B1018 determines whether or not to continue making the explanatory materials transparent. Specifically, it determines whether or not to continue making the explanatory materials transparent based on the calculated time that has been input from the elapsed time calculating unit B1017. That is, it determines whether or not to continue to change the transparency of the overlapping region, which is the region in the explanatory materials that overlaps with the human body.

In a case in which as the determination results, the determining unit B1018 has determined to continue to make the explanatory materials transparent, information to continue to make the explanatory materials transparent is output to the overlapping region extracting unit A1009. In contrast, in a case in which it has been determined that the explanatory materials will not continue to be made transparent, information that these will not continue to be made transparent is output to the image superimposing unit B1011. The state of the processing for the determining unit B1018 in the present embodiment will be explained below with reference to FIG. 13.

Figure 13:
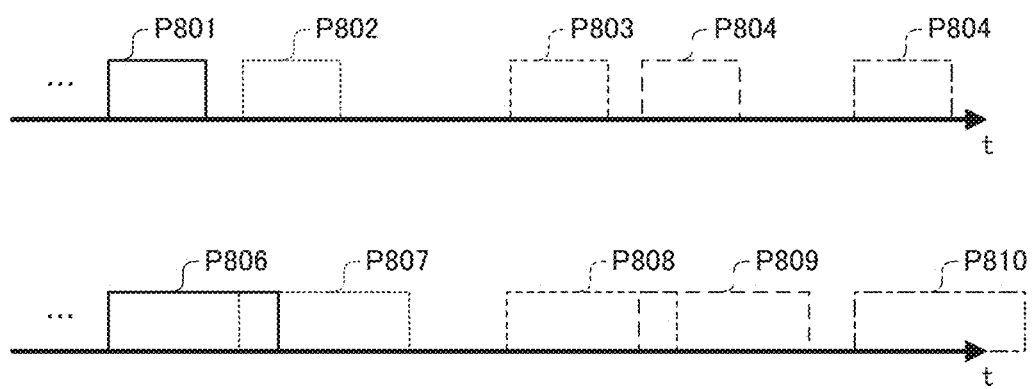
FIG. 13 is a diagram showing a speaking segment for a human body and a transparency change segment for a materials region according to the Second Embodiment.

FIG. 13 is a diagram showing a speech segment for a human body and a transparent segment of the explanatory materials according to the Second Embodiment. In FIGS. 13, P801, P802, P803, P804, and P805 each show speech segments for the human body. P806, P807, P808, P809, and P810 each show the continuation time for making the explanatory materials transparent in relation to each of the speech times.

In FIG. 13, it is shown that making the explanatory materials transparent begins at the same time as the start for each speech time, and after each speech ends this is continued for a fixed time. In this manner, the transparency changing unit A1010 according to the present embodiment continues to change the transparency of the explanatory materials until a predetermined amount of time has elapsed since the speech of the human body has been completed based on the calculated time that was calculated by the elapsed time calculating unit B1017.

In addition, in the present embodiment, the fixed time during which the explanatory materials are continued to be made transparent (the predetermined time) is made to be 10 seconds. However, this is an example, and the time during which the explanatory materials are continued to be made transparent may be made any number of seconds.

The image superimposing unit B1011 superimposes the explanatory materials onto the video image information. Specifically, in a case in which explanatory materials for which the transparency has been changed and video image information have been input from the transparency changing unit A1010, the image superimposing unit B1011 superimposes the explanatory materials for which the transparency has been changed onto the video image information.

In addition, in a case in which explanatory materials for which the transparency has been changed have not been input from the transparency changing unit A1010, explanatory materials for which the transparency has not been changed (the explanatory materials that have been input from the materials acquisition unit A1005) are superimposed onto the video image information.

In addition in a case in which information to not continue changing the transparency is input from the determining unit B1018, explanatory materials for which the transparency has not been changed are superimposed onto the video image information. The image superimposing unit B1011 outputs the video image information onto which these explanatory materials have been superimposed to the video image output unit A1012. In this context, an explanation will be given below of one example of the superimposition processing for the image superimposing unit B1011 in the Second Embodiment with reference to FIG. 12.

Figure 12A:
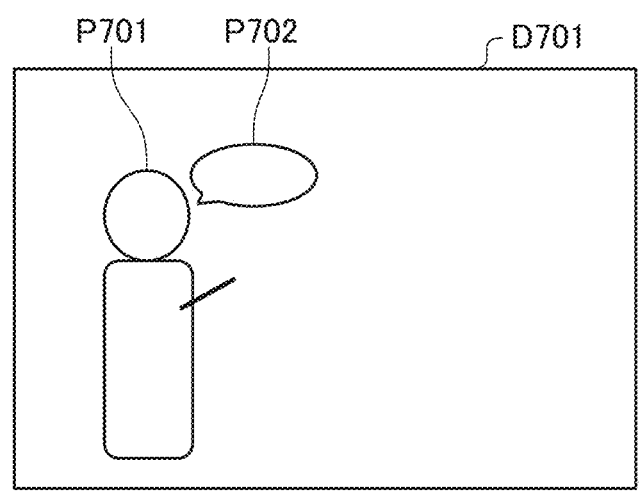
FIGS. 12A and 12B are diagrams explaining a state in which explanatory materials in which a region that overlaps with a region of a human body has been made transparent are superimposed onto a video image captured of the human body when the human body is speaking according to the Second Embodiment.
Figure 12B:
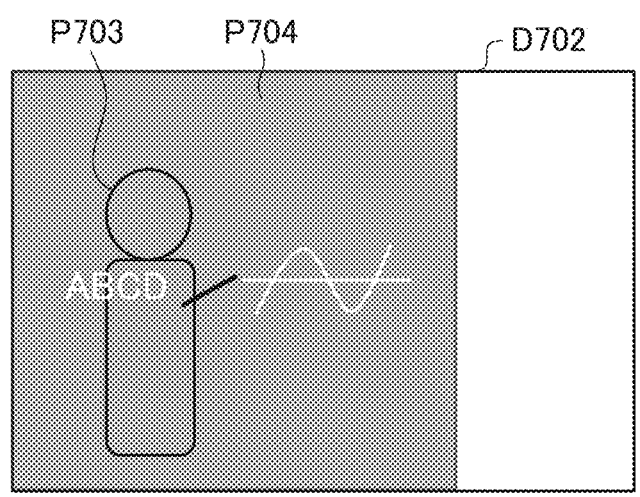

FIGS. 12A-B are diagrams explaining a state in which explanatory materials for which a region that overlaps with a region of a human body has been made transparent have been superimposed onto video image information when the human body is speaking according to the Second Embodiment. In FIG. 12A, D701 shows a video image that has been captured of a human body.

In FIG. 12B, D702 shows a video image in which explanatory materials have been superimposed onto the video image D701. P701, and P703 both show human bodies. P702 shows an example of a state in which the human body is speaking. P704 shows the explanatory materials.

In this context, the human body P701 that is shown in FIG. 12A is speaking. Therefore, it is determined that they are giving a verbal explanation. Therefore, the image superimposing unit B1011 superimposes explanatory materials for which the transparency has been changed onto the video image information that has been captured of the human body P703. By doing so, in the superimposed image on which the explanatory materials D702 have been superimposed, the region of the explanatory materials that overlaps with the human body region (the superimposition region) is made transparent.

In this manner, in a case in which the human body has given a verbal explanation, by making the region of the explanatory materials that overlaps with the region of the human body transparent, it is possible to see what part of the explanatory materials the human body is explaining.

Figure 14:
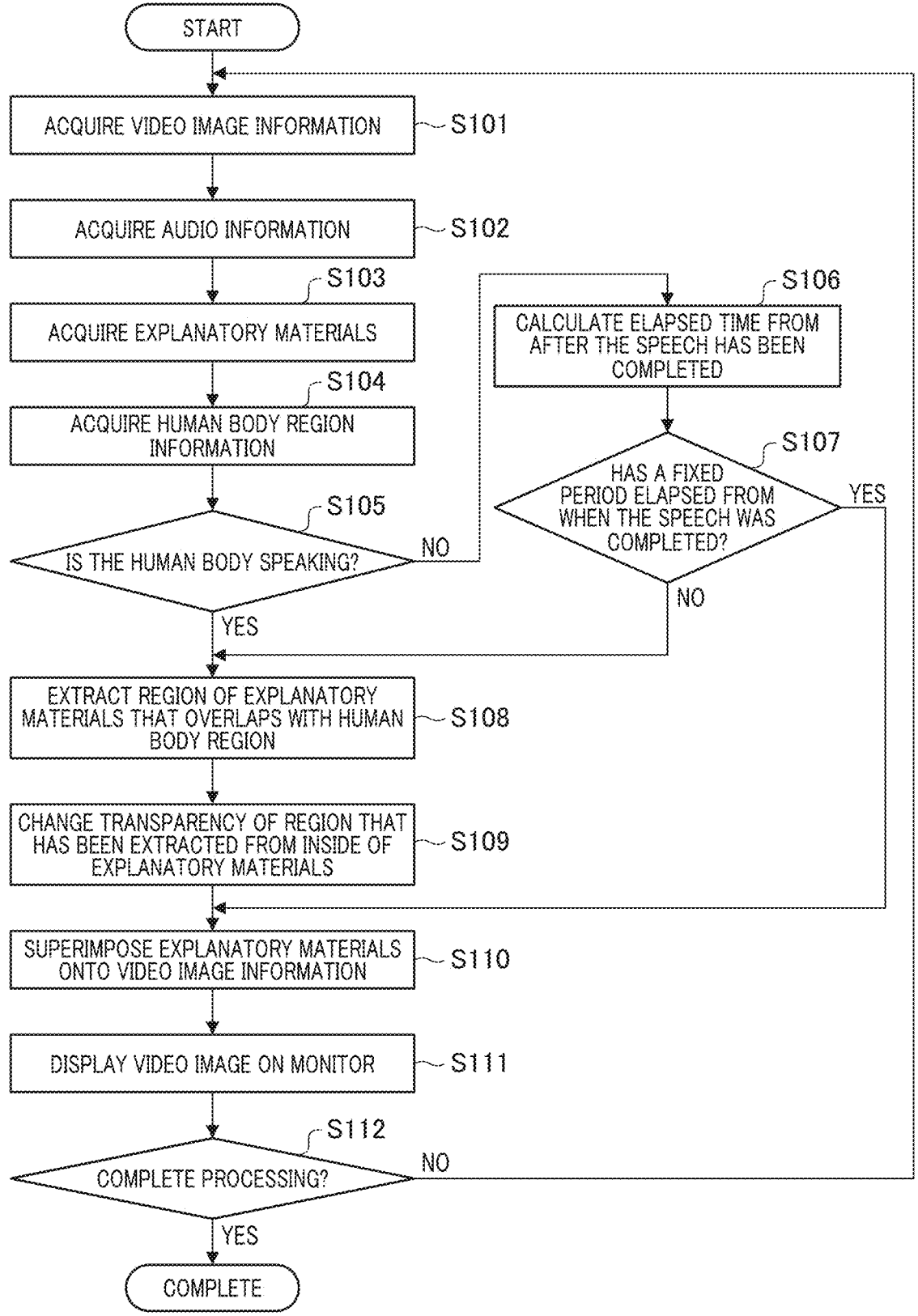
FIG. 14 is a flowchart showing processing procedures for an automatic image capturing system according to the Second Embodiment.

In this context, the processing procedure for the automatic image capturing system B1000 according to the Second Embodiment will be explained with reference the flowchart in FIG. 14. FIG. 14 is a flowchart showing the processing procedures for the automatic image capturing system B1000 according to the Second Embodiment.

Each processing that is described below is realized by the CPU 11 of the image superimposing apparatus B1003 executing a program that has been stored on the ROM 12 or the like. In addition, the expression of each process (step) has been shortened by adding an S to the beginning of each process (step). Upon the automatic image capturing system B1000 being started up by a user operation via the input apparatus 16 or the like, the automatic image capturing system begins.

First, during step S101, the video image acquisition unit A1004 acquires video image information from the video image acquisition apparatus A1001. After this, the processing proceeds to S102.

Next, during S102, the audio input unit B1015 acquires audio information from the audio acquisition apparatus B1014. After this, the processing proceeds to S103.

Next, during S103, the materials acquisition unit A1005 acquires the explanatory materials from the materials acquisition apparatus A1002. After the acquisition of the explanatory materials, the materials acquisition unit A1005 outputs the acquired explanatory materials to the overlapping region extraction unit A1009 and the image superimposing unit B1011. After this, the processing proceeds to S104.

Next, during S104, the region division processing unit A1008 performs region division processing using the video image information that has been acquired from the video image acquisition unit A1004. In addition, the region division processing unit A1008 outputs the region information that has been divided to the overlapping region extraction unit A1009. After this, the processing proceeds to S105.

Next, during S105, the speech determining unit B1016 performs voice segment detection using the audio information that has been input from the audio input unit B1015, and determines whether or not the human body is giving a verbal explanation. In a case in which the result of the determination is that the human body is giving a verbal explanation (YES during S105), the speech determining unit B1016 outputs information that the human body us giving a verbal explanation (first information) to the overlapping region extracting unit A1009. In addition, the processing proceeds to S108.

In contrast, in a case in which a verbal explanation is not being given (NO during S105), the speech determining unit B1016 outputs information that the human body is not speaking (second information) to the elapsed time calculating unit B1017. After this, the processing proceeds to S106.

Next, during S106, the elapsed time calculating unit B1017 calculates the time that has elapsed since the speech ended based on the second information that has been input from the speech determining unit B1016. In addition, the elapsed time calculating unit B1017 outputs the time that has been calculated to the determining unit B1018. After this, the processing proceeds to S107.

Next, during S107, the determining unit B1018 determines whether or not the elapsed time from after the end of the speech that was input from the elapsed time calculating unit B1017 exceeds a fixed time. In a case in which the result of the determination is that the elapsed time does exceed the fixed time (YES during S107), information to not change the transparency (to not continue changing the transparency) is output to the image superimposing unit B1011. After this, the processing proceeds to S110.

In contrast, in a case in which the elapsed time does not exceed the fixed time (NO during S107), information to change the transparency (to continue to change the transparency) is output to the overlapping region extracting unit A1009. After this, the processing proceeds to S108.

Next, during S108, the overlapping region extracting unit A1009 extracts the overlapping region from the explanatory materials. Specifically, in a case in which the first information has been input from the speech determining unit B1016, or in a case in which information to change the transparency has been input from the determining unit B1018, the overlapping region is extracted using the region information for the human body that has been input from the region division processing unit A1008 and the explanatory materials that have been input from the materials acquisition unit A1005.

In addition, the overlapping region extracting unit A1009 outputs the overlapping region that has been extracted to the transparency changing unit A1010. After this, the processing proceeds to S109.

Next, during S109, the transparency changing unit A1010 uses the explanatory materials and the overlapping region that have been input from the overlapping region extracting unit A1009 and changes the transparency of the explanatory materials (makes these transparent). Then, the transparency changing unit A1010 outputs the explanatory materials for which the transparency has been changed to the image superimposing unit B1011. After this, the processing proceeds to S110.

Next, during S110, the image superimposing unit B1011 superimposes the explanatory materials onto the video image information. In this context, in a case in which explanatory materials in which the transparency has been changed have been input from the transparency changing unit A1010, these explanatory materials in which the transparency has been changed are superimposed onto the video image information.

In addition, in a case in which explanatory materials in which the transparency has not been changed have not been input from the transparency changing unit A1010, the explanatory materials in which the transparency has not been changed that were acquired from the materials acquisition unit A1005 are superimposed onto the video image information.

In addition, in a case in which information to not change the transparency has been input from the determining unit B1018, the explanatory materials for which the transparency has not been changed that were acquired from the materials acquisition unit A1005 are superimposed onto the video image information. In addition, the image superimposing unit B1011 outputs a superimposed video image that is the video image onto which these have been superimposed to the video image output unit A1012. After this, the processing proceeds to S111.

Next, during S111, the video image output unit A1012 outputs the video image information (superimposed video image) that has been input from the image superimposing unit B1011 to the monitor apparatus A1013. In a case in which this video image information has been input from the video image output unit A1012, the monitor apparatus A1013 displays video images or images that are in this video image information on the screen. After this, the processing proceeds to S112.

Next, during S112, whether or not to end the processing is determined. Specifically, it is identified whether or not the On/Off switch for the automatic image capturing system, which is not shown, has been operated by a user operation and a stopping operation for the video image processing has been performed.

In a case in which the result of this determination is that a stopping operation has not been performed for the automatic image capturing processing (NO during S112), the processing proceeds to S101, and the same processing is repeated. In contrast, in a case in which a stopping operation has been performed for the automatic image capturing processing (YES during S112), the automatic image processing is completed, and the flow of the present processing is completed.

In the manner that was described above, when explanatory materials are being superimposed onto video image information, the automatic image capturing system B1000 of the Second Embodiment is able to change the transparency of a region of the explanatory materials that overlaps with the human body region only when the human body is giving a verbal explanation.

It is thereby possible to see on the screen what part of the explanatory materials the human body is explaining when the human body is performing an explanatory action. In addition, it is possible to see the entirety of the explanatory materials on the screen when the human body is not performing an explanatory action.

Third Embodiment

Figure 15:
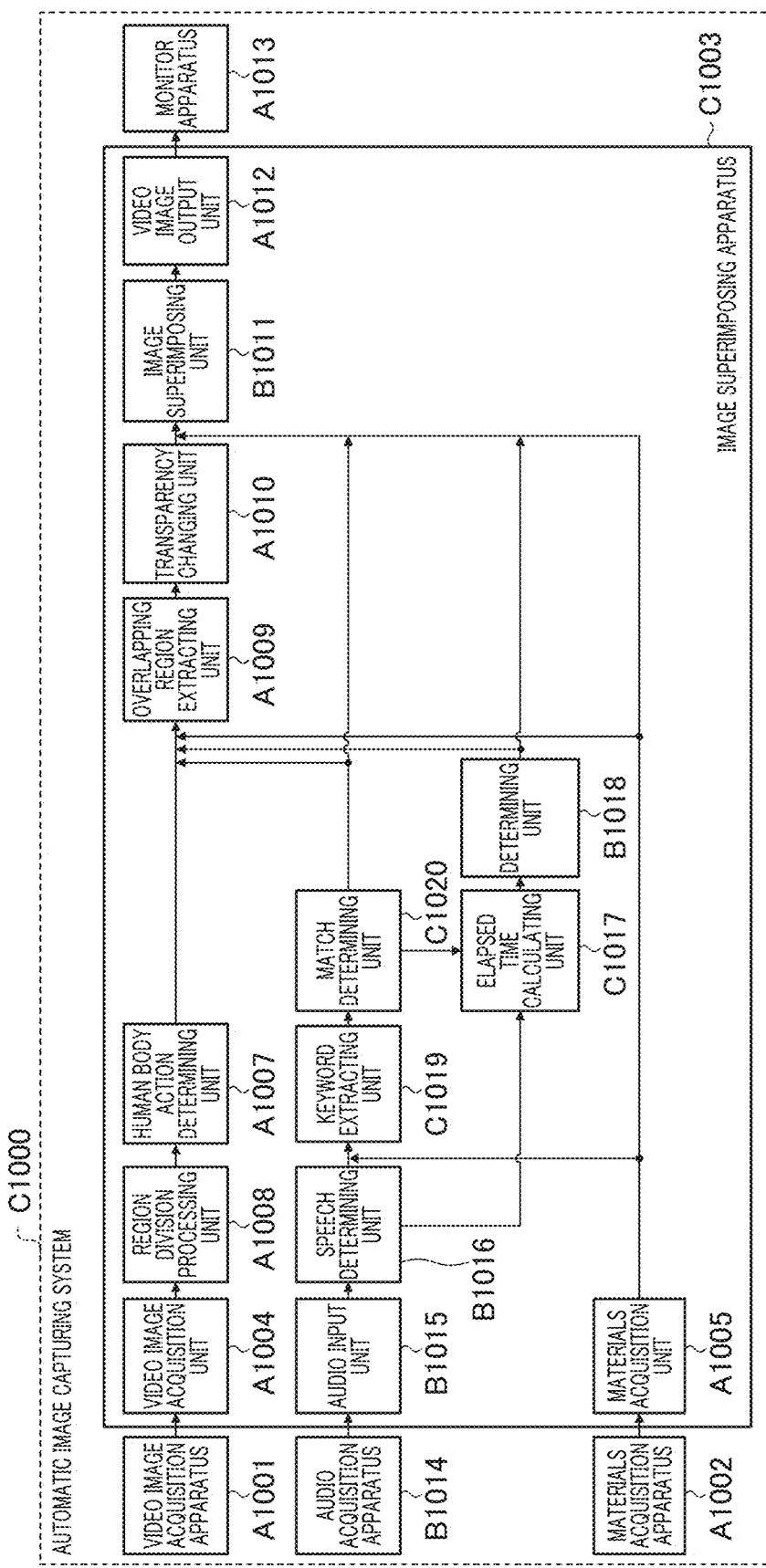
FIG. 15 is a configurational block diagram of an automatic image capturing system according to a Third Embodiment.

A configurational example of an image superimposing apparatus C1003 according to the Third Embodiment will be explained with reference to FIG. 15. FIG. 15 is a block diagram showing the functional configuration of an automatic image capturing system C1000 that comprises the image superimposing apparatus C1003 according to the Third Embodiment.

Note that in the following explanation, detailed explanations of the configurations and the like of the apparatuses and functional units that are the same as those of the automatic image capturing systems A1000 and B1000 in the First Embodiment and the Second Embodiment will be omitted. In addition, the hardware configuration is also the same as that of the automatic image capturing system A1000 in the First Embodiment, and therefore an explanation thereof will be omitted.

The automatic image capturing system C1000 detects a human body from a video image that has been captured, and determines if the human body is speaking from audio information that has been acquired from a microphone. In addition, in the case in which they are speaking, predetermined keywords are extracted from the audio information and the explanatory materials.

In addition, in a case in which keywords from both of these are the same or are similar, it is assumed that the human body is giving a verbal explanation, and a region of the explanatory materials that have been acquired that overlaps with the region of the human body that is giving the explanation (the overlapping region) is made transparent (the transparency is changed), and is then superimposed onto the video image information. In addition, this is a processing system that displays the superimposed video image, which is the video image onto which this has been superimposed, on a monitor apparatus A1013.

The automatic image capturing system C1000 is configured so as to have the video image acquisition apparatus A1001, the materials acquisition apparatus A1002, the image superimposing apparatus C1003, the monitor apparatus A1013, and the audio acquisition apparatus B1014.

The image superimposing apparatus C1003 is communicably connected to the video image acquisition apparatus A1001, the materials acquisition apparatus A1002, the monitor apparatus A1013, and the audio acquisition apparatus B1014. The image superimposing apparatus C1003 and the monitor apparatus A1013 are connected via a circuit, such as a video interface or the like.

The image superimposing apparatus C1003 acquires region information for the human body from video images that have been input from the video image acquisition apparatus A1001, and determines whether or not the human body is speaking from the audio information that has been input from the audio acquisition apparatus B1014. In addition, predetermined keywords are extracted from the audio information and the explanatory materials, and in a case in which the keywords are the same or match, it is assumed that the human body is giving a verbal explanation, and the transparency of a region in the explanatory materials that overlaps with the human body region is made transparent and then superimposed onto the video image information.

In addition, it is assumed that the explanation continues for a fixed period after the speech has finished, and the transparency for the region (the overlapping region) in the explanatory materials that overlaps with the human body region is continued to be changed. After this, the image superimposing apparatus C1003 outputs the superimposed video image, which is a video image onto which this has been superimposed, to the monitor apparatus A1013.

The image superimposing apparatus C1003 is configured to have the video image acquisition unit A1004, the materials acquisition unit A1005, the region division processing unit A1008, the overlapping region extracting unit A1009, the transparency changing unit A1010, the image superimposing unit B1011, and the video image output unit A1012 as functional units.

Furthermore, the image superimposing apparatus B1003 is configured to have the audio input unit B1015, the speech determining unit B1016, an elapsed time calculating unit C1017, the determining unit B1018, a keyword extracting unit C1019, and a match determining unit C1020 as functional units Each of these functional units is realized by the CPU 11 decompressing a program that has been stored on the ROM 12 onto the RAM 13 and executing it in the same manner as in the First Embodiment. In addition, the CPU 11 stores the execution results of each processing explained below on the RAM 13 or a predetermined storage medium.

The keyword extracting unit C1019 extracts keywords from both the audio information and the explanatory materials. Specifically, it extracts predetermined keywords from the audio information that has been input from the speech determining unit B1016 and the explanatory materials that have been input from the materials acquisition unit A1005. Keywords are extracted from the audio information by speech recognition technology.

Keywords are extracted from the explanatory materials using OCR (optical character information) and from tag information that has been embedded into the explanatory materials in advance. The keyword extracting unit C1019 outputs the extracted keywords to the match determining unit C1020.

In the present embodiment, the keyword extracting unit C1019 functions as third extracting unit configured to extract keywords from both audio information and explanatory materials The match determining unit C1020 determines if keywords that have been extracted by the keyword extracting unit C1019 from both the audio information and the explanatory materials match or are similar. Specifically, it is determined whether or a keyword that has been extracted from the speech contents that have been input from the keyword extracting unit C1019 matches or is similar to a keyword that has been extracted from the explanatory materials.

In a case in which the speech contents and the explanation contents match or are similar, the match determining unit C1020 outputs third information, which is information that these match or are similar, to the overlapping region extracting unit A1009. In contrast, in a case in which the speech contents and the explanation contents do not match and are not similar, the match determining unit C1020 outputs fourth information, which is information that these do not match and are not similar, to the elapsed time calculating unit C1017 and the image superimposing unit B1011.

In the present embodiment, the match determining unit C1020 functions as a third determining unit configured to determine whether or not both keywords that have been extracted by the keyword extracting unit C1019 match or are similar.

Figures 16A, 16B:
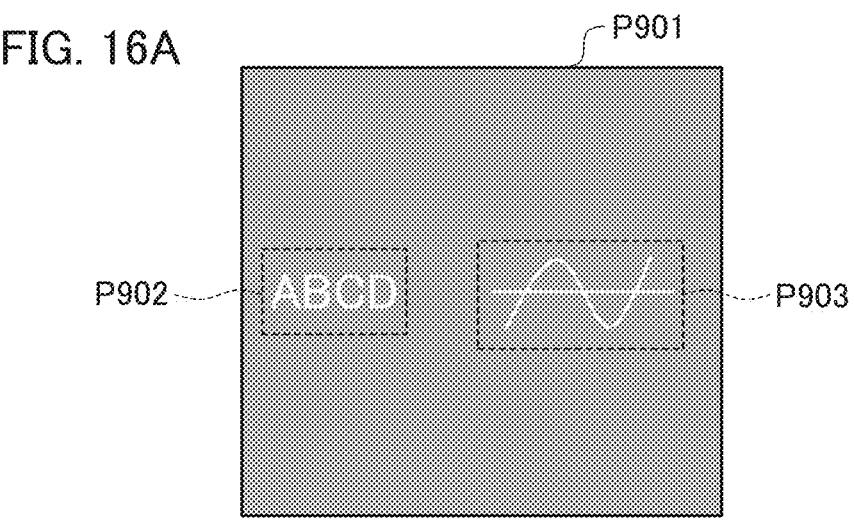
FIGS. 16A and 16B are diagrams explaining the specification of an explanatory region from speech contents and contents of explanatory materials according to the Third Embodiment.

FIGS. 16A-B are diagrams explaining the specification of an explanatory region from the speech contents of a human body and the contents of the explanatory materials according to the Third Embodiment. FIG. 16A is a diagram showing an example of the explanatory materials and a region in the explanatory materials.

FIG. 16B is a diagram showing an example of a keyword that has been extracted from speech. The explanatory region is a region in which a diagram, table, image, video image, animation, characters, or the like for use in an explanation is displayed in the explanatory materials.

In FIG. 16A, P901 shows the explanatory materials. P902 is a region inside of the explanatory materials, and shows a region 1 inside a table. P903 is a region inside of the explanatory materials, and shows a region 2 inside a table. In FIG. 16B, keywords that have been extracted from the speech, specifically, keywords that have been extracted from the region P902, which is the region 1, and the region P903, which is the region 2, are shown in the table.

Using FIGS. 16A-B as an example, if the keywords from the speech contents are compared with the keywords for the region P902, which is the region 1, and the region P903, which is the region 2, the keywords region and area match the keywords for the region P903, which is the region 2. Therefore, in the example that is shown in FIGS. 16A-B, the match determining unit C1020 is able to determine that the human body is giving a verbal explanation of the region P903, which is the region 2.

The elapsed time calculating unit C1017 calculates the time that has elapsed from when the speech of the human body ended. Specifically, it calculates the time that has elapsed since the speech that matches the contents of the explanatory materials ended based on the second information that has been input from the speech determining unit B1016 and the fourth information that has been input from the match determining unit C1020. Note that in a case in which the second information has not been input, the time calculation is completed. In addition, the elapsed time calculating unit C1017 outputs the calculated time to the determining unit B1018.

Figure 17:
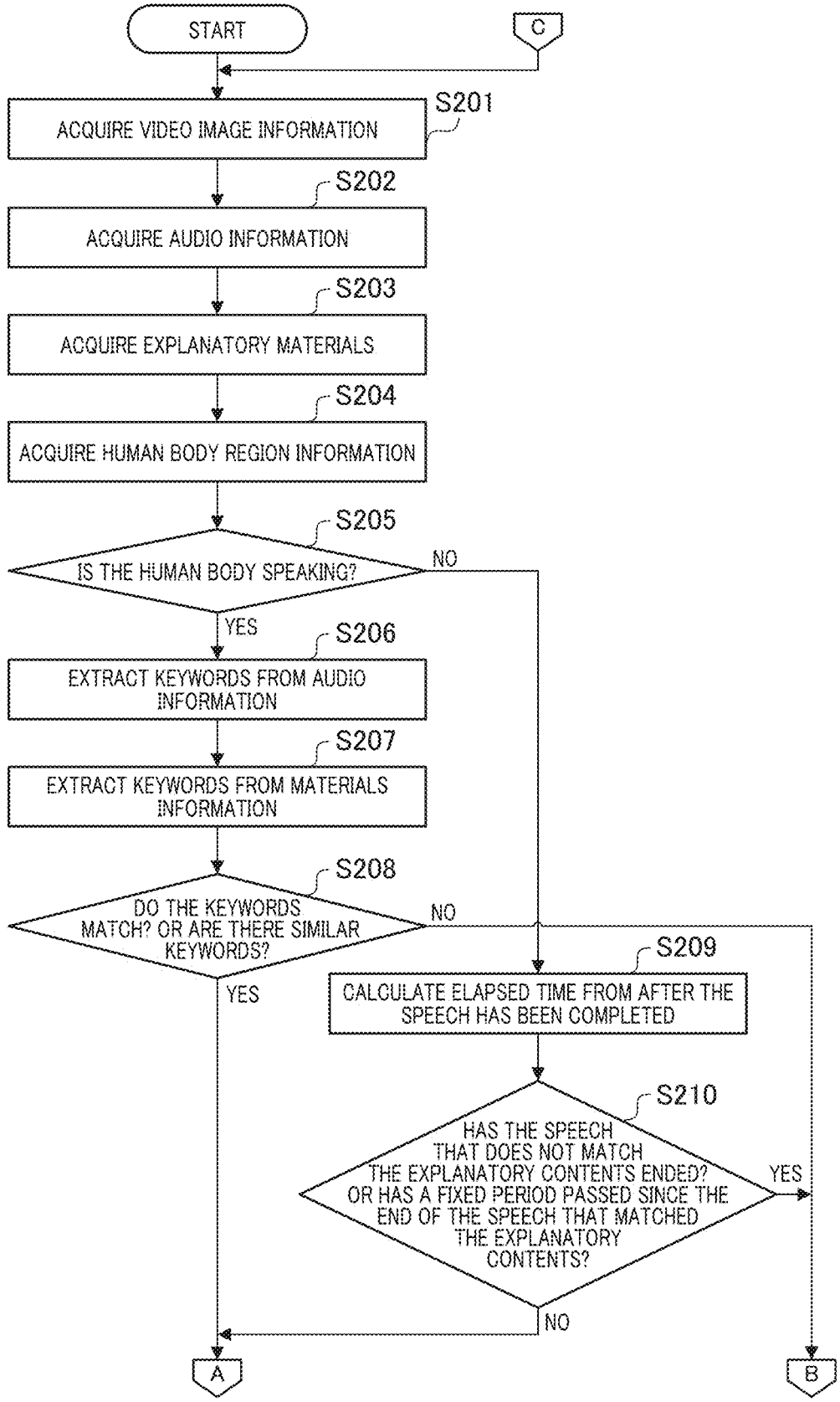
FIG. 17 is a flowchart showing processing procedures for an automatic image capturing system according to the Third Embodiment.
Figure 18:
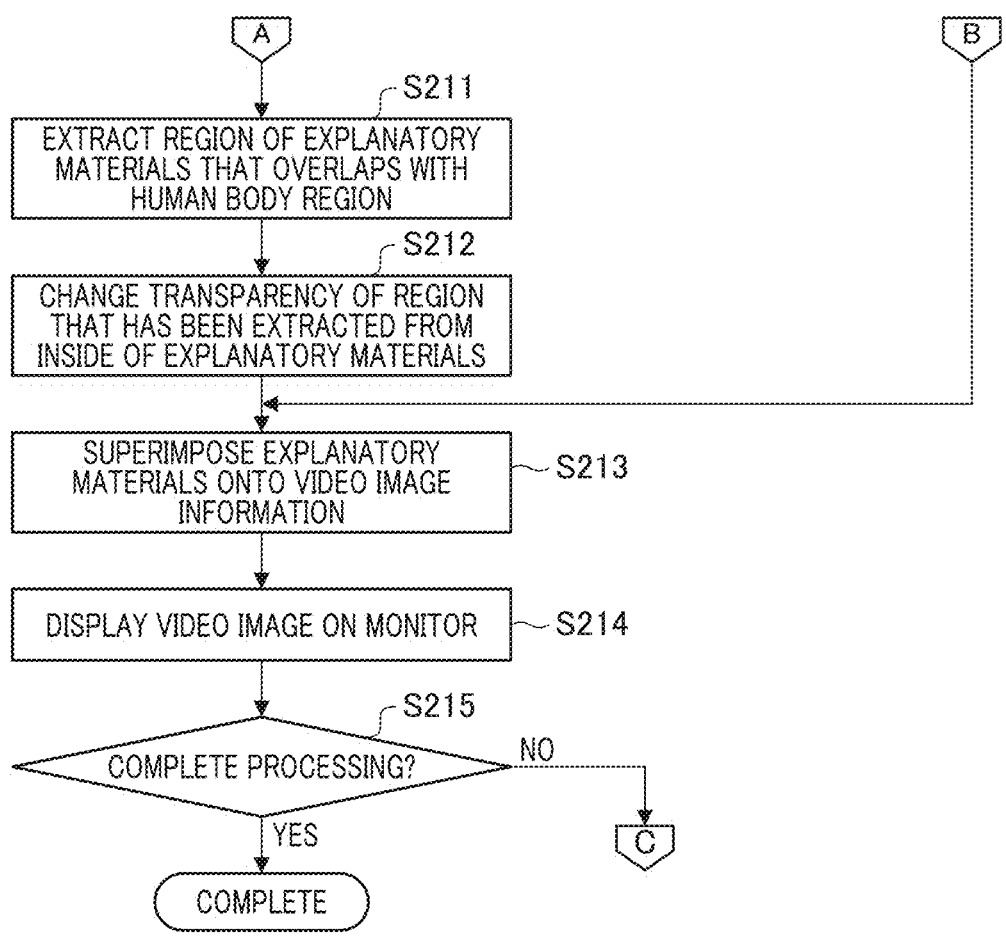
FIG. 18 is a flowchart showing processing procedures for an automatic image capturing system according to the Third Embodiment.

In this context, the processing procedures for the automatic image capturing system C1000 according to the Third Embodiment will be explained while referencing the flowcharts in FIG. 17, and FIG. 18. FIG. 17 and FIG. 18 are flowcharts showing the processing procedures for the automatic image capturing system C1000 according to the Third Embodiment.

Each processing described below is realized by the CPU 11 of the image superimposing apparatus C1003 executing a program that has been stored on the ROM 12 or the like. In addition, the expression of each process (step) has been shortened by adding an "S" to the beginning of each process (step). The automatic image capturing system begins upon the automatic image capturing system C1000 being started up by a user operation via the input apparatus 16 or the like.

First, during S201, the video image acquisition unit A1004 acquires video image information from the video image acquisition apparatus A1001. Next, the processing proceeds to S202.

Next, during S202, the audio input unit B1015 acquires audio information from the audio acquisition apparatus B1014. After this, the processing proceeds to S203.

Next, during S203, the materials acquisition unit A1005 acquires the explanatory materials from the materials acquisition apparatus A1002. After the acquisition of the explanatory materials, the materials acquisition unit A1005 outputs the explanatory materials that have been acquired to the overlapping region extracting unit A1009 and the image superimposing unit B1011. After this, the processing proceeds to S204.

Next, during S204, the region division processing unit A1008 uses the video image information that has been acquired from the video image acquisition unit A1004 and performs region division processing. In addition, the region division processing unit A1008 outputs the divided region information to the overlapping region extracting unit A1009. After this, the processing proceeds to S204.

Next, during S205, the speech determining unit B1016 performs voice segment detection using the audio information that has been input from the audio input unit B1015, and determines whether or not the human body is giving a verbal explanation. In a case in which the result of the determination is that a verbal explanation is being given (YES during S205), the speech determining unit B1016 outputs the information that the human body is giving a verbal explanation (first information) to the keyword extracting unit C1019. After this, the processing proceeds to S206.

In contrast, in a case in which a verbal explanation is not being given (NO during S205), the information that the human body is not speaking (second information) is output to the elapsed time calculating unit C1017. After this, the processing proceeds to S209.

Next, during S206, the keyword extracting unit C1019 extracts keywords from the audio information that has been input from the speech determining unit B1016. In addition, the keyword extracting unit C1019 outputs the keywords that have been extracted to the match determining unit C1020. After this, the processing proceeds to S207.

Next, during S207, the keyword extracting unit C1019 extracts keywords from the explanatory materials that have been input from the materials acquisition unit A1005. The keyword extracting unit C1019 outputs the keywords that have been extracted to the match determining unit C1020. After this, the processing proceeds to S208. Note that the processing order for the processing for S206 and S207 may also be reversed.

Next, during S208, the match determining unit C1020 determines if the keywords that have been extracted from the audio information and the keywords that have been extracted from the explanatory materials that have been input from the keyword extracting unit C1019 match or are similar.

In a case in which the result of the determination is that the audio information and the keywords match or are similar (YES during S208), the match determining unit C1020 outputs information (third information) that this matches the explanation contents to the overlapping region extracting unit A1009. After this, the processing proceeds to S211.

In contrast, in a case in which the audio information and the keywords do not match and are not similar (NO during S208), the match determining unit C1020 outputs information (fourth information) that this does not match the explanation contents to the image superimposing unit B1011 and the elapsed time calculating unit C1017. After this, the processing proceeds to S213.

Next, during S209, the elapsed time calculating unit C1017 calculates the elapsed time from when the speech that did not match the contents of the explanatory materials ended based on the second information that has been input from the speech determining unit B1016 and the fourth information that has been input from the match determining unit C1020. The elapsed time calculating unit C1017 outputs the calculated time (the elapsed time) to the determining unit B1018. After this, the processing proceeds to S210.

Next, during S210, the determining unit B1018 determines whether or not the speech that did not match the explanatory materials has ended, or whether or not the elapsed time from when the speech that did match the explanatory materials had ended exceeds a fixed time based on the elapsed time that has been input from the elapsed time calculating unit C1017.

In a case in which the result of this determination is that the speech that did not match the explanatory materials has ended, or that the elapsed time exceeds the fixed time (YES during S210), the determining unit B1018 outputs information to not make the explanatory materials transparent to the image superimposing unit B1011. After this, the processing proceeds to S213.

In contrast, in a case in which the speech that does not match the explanatory materials has not ended, or the elapsed time has not exceeded the fixed time (NO during S210), the determining unit B1018 outputs information to make the explanatory materials transparent to the overlapping region extracting unit A1009. After this, the processing proceeds to S211.

Next, during S211, the overlapping region extracting unit A1009 extracts the overlapping region using the region information for the human body that has been input from the region division processing unit A1008 and the explanatory materials that have been input from the materials acquisition unit A1005. In addition, the overlapping region extracting unit A1009 outputs the overlapping region that has been extracted to the transparency changing unit A1010. After this, the processing proceeds to S212.

Next, during S212, the transparency changing unit A1010 changes the transparency of the explanatory materials (makes them transparent) using the explanatory materials and the overlapping region that have been input from the overlapping region extracting unit A1009. In addition, the transparency changing unit A1010 outputs the explanatory materials that have been made transparent to the image superimposing unit B1011. After this, the processing proceeds to S213.

Next, during S213, the image superimposing unit B1011 superimposes the explanatory materials onto the video image information. In this context, in a case in which explanatory materials for which the transparency has been changed have been input from the transparency changing unit A1010, these explanatory materials for which the transparency has been changed are superimposed onto the video image information. In addition, in a case in which information to not change the transparency has been input from the determining unit B1018, explanatory materials for which the transparency has not been changed that have been input from the materials acquisition unit A1005 are superimposed onto the video image information.

In addition, in the case in which information that the speech contents and the contents of the explanatory materials do not match (fourth information) has been input from the match determination unit C1020, explanatory materials for which the transparency has not been changed that have been input from the materials acquisition unit A1005 will be superimposed onto the video image information. In addition, the image superimposing unit B1011 outputs the video image onto which these have been superimposed to the video image output unit A1012. After this, the processing proceeds to S214.

Next during S214, the video image output unit A1012 outputs the video image information (the superimposed video image) that has been input from the image superimposing unit B1011 to the monitor apparatus A1013. In a case in which this video image information has been input from the video image output unit A1012, the monitor apparatus A1013 displays video images or images from this video image information on the screen. After this, the processing proceeds to S215.

Next, during S215, whether or not to complete the processing is determined. Specifically, it is identified whether or not the On/Off switch for the automatic image capturing system, which is not shown, has been operated by a user operation, and if a stopping operation has been performed for the automatic image capturing processing.

In a case in which the result of the determination is that a stopping operation for the automatic image capturing processing has not been performed (NO during S215), the processing proceeds to S201, and the same processing is repeated. In contrast, in a case in which a stopping operation for the automatic image capturing processing has been performed (YES during S215), the automatic image capturing processing is completed, and the flow of the present processing is completed.

In the above-described manner, when superimposing explanatory materials onto video image capturing information, the automatic image capturing system A1000 in the Third Embodiment changes the transparency of a region of the explanatory materials that overlaps with the human body region only in a case in which the contents of a verbal explanation by the human body and the contents of the explanatory materials match or are similar.

It is thereby possible to see on the screen what part of the explanatory materials the human body is explaining when the human body is giving an explanation, and it is possible to see the entirety of the explanatory materials on the screen when the human body is not performing an explanatory action.

Fourth Embodiment

Figure 19:
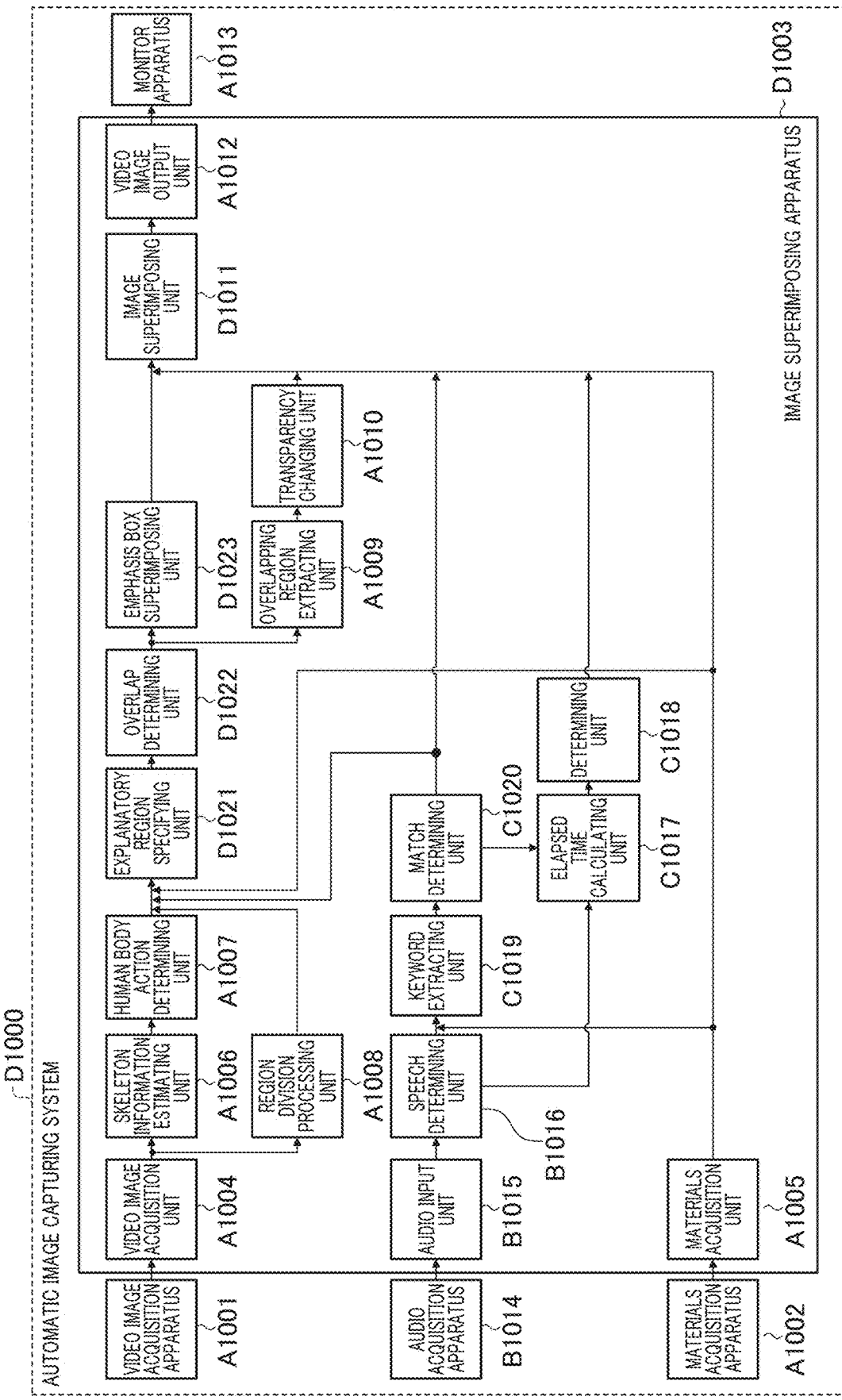
FIG. 19 is a configuration block diagram for an automatic image capturing system according to a Fourth Embodiment.

A configuration of the image superimposing apparatus D1003 according to the Fourth Embodiment will be explained with reference to FIG. 19. FIG. 19 is a block diagram showing the functional configuration of an automatic image capturing system D1000 that comprises the image superimposing apparatus D1003 according to the Fourth Embodiment.

Note that below, detailed descriptions of the configurations and the like of the apparatuses and functional units that are the same as the configurations of the apparatuses and functional units in the automatic image capturing systems A1000, B1000, and C1000 in the First, Second, and Third Embodiments will be omitted. In addition, the hardware configuration is also the same as the hardware configuration of the automatic image capturing system A1000 in the First Embodiment, and an explanation thereof will therefore be omitted.

The automatic image capturing system D1000 detects a human body from a video image that has been captured. In addition, in a case in which it has been determined that the human body is performing an explanatory action from the skeleton information for the human body, when it has also been determined that a verbal explanation is being given from a state in which the contents of audio information that has been acquired from a microphone and the contents of the explanatory materials are similar, emphasis processing is performed on the explanatory materials in cases in which a region of the human body and the explanatory region overlap.

In contrast, this is a processing system in which in a case in which a region of the human body and the explanatory region do not overlap, the overlapping region, which is the region of the explanatory materials that overlaps with the human body, is made transparent (the transparency is changed), and this is superimposed onto the video image captured of the human body, and the result thereof is displayed on a monitor.

The automatic image capturing system D1000 is configured so as to have a video image acquisition apparatus A1001, a materials acquisition apparatus A1002, an image superimposing apparatus D1003, a monitor apparatus A1013, and an audio acquisition apparatus B1014.

The image superimposing apparatus D1003 is communicably connected to the video image acquisition apparatus A1001, the materials acquisition apparatus A1002, the monitor apparatus A1013, and the audio acquisition apparatus B1014. The image superimposing apparatus D1003 and the monitor apparatus A1013 are connected via a circuit, such as a video interface or the like.

The image superimposing apparatus D1003 detects a human body from a video image that has been input from the video image acquisition apparatus A1001, and determines if an explanatory action is being performed from the skeleton information for the human body that has been detected. In addition, upon audio information being input from the audio acquisition apparatus B1014, whether or not the human body is speaking is determined from the audio, and it is determined if the contents of this match the contents of the explanatory materials.

In a case in which an action or a verbal explanation has been determined, an explanatory region in which the explanation is being made is specified from the explanatory materials, and whether or not the explanatory region overlaps with a region of the human body is determined. In a case in which the explanatory region does overlap with a region of the human body, emphasis processing is performed on the explanatory region without performing transparency processing for the overlapping region, which is the region of the explanatory materials that overlaps with the human body, and the explanatory region.

In a case in which these do not overlap, the overlapping region is made transparent (its transparency is changed), and this is superimposed onto the video image information. The video image onto which this has been superimposed is output to the monitor apparatus A1013.

The image superimposing apparatus D1003 is configured so as to have the video image acquisition unit A1004, the materials acquisition unit A1005, the skeleton information estimating unit A1006, the human body action determining unit A1007, the region division processing unit A1008, the overlapping region extracting unit A1009, the transparency changing unit A1010, the video image output unit A1012, and the audio input unit B1015 as functional units.

Furthermore, the image superimposing apparatus D1003 is also configured so as to have the speech determining unit B1016, the elapsed time calculating unit C1017, a transparency continuation determining unit B1018 (determining unit B1018), the keyword extracting unit C1019, and the match determining unit C1020 as functional units.

Furthermore, the image superimposing apparatus D1003 is configured to as to also have an explanatory region specifying unit D1021, an overlap determining unit D1022, an emphasis box superimposing unit D1023, and an image superimposing unit D1011 as functional units.

In the same manner as in the First Embodiment, each of these functional units is realized by the CPU 11 decompressing a program that has been stored on the ROM 12 onto the RAM 13 and executing this. In addition, the CPU 11 stores the execution results of each processing to be described below on the RAM 13 or a predetermined storage medium.

The explanatory region specifying unit D1021 specifies an explanatory region, which is a region that is the target of an explanatory action of the human body, from the explanatory materials. Specifically, the region that is the target of the explanatory action of the human body is specified using the skeleton information for the human body, the video image information, the region information, the explanatory materials, and information for the explanatory region that matches the verbal explanation.

The skeleton information and the video image information are input from the human body action determining unit A1007. In addition, the region information is input from the region division processing unit A1008. The explanatory materials are input from the materials acquisition unit A1005. The information for the explanatory region that matches the verbal explanation is input from the match determining unit C1020. The explanatory region specifying unit D1021 outputs the explanatory region that has been specified, the region information, the video image information, and the explanatory materials to the overlap determining unit D1022.

Figure 20:
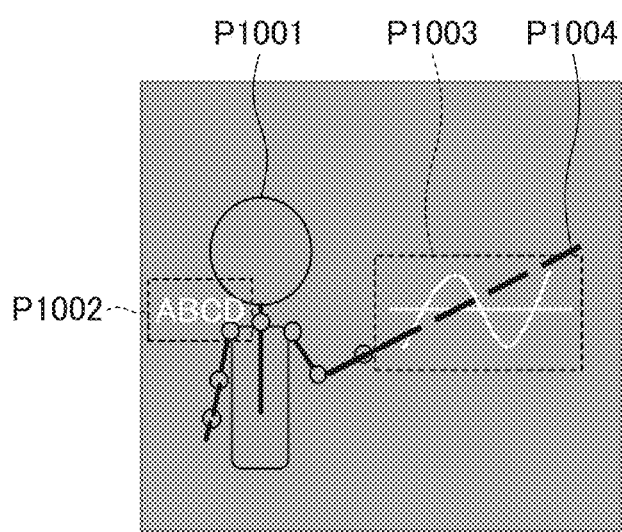
FIG. 20 is a diagram showing the specification of an explanatory region from an explanatory action of a human body according to the Fourth Embodiment.

FIG. 20 is a diagram in which an explanatory region is specified from an explanatory action of a human body according to the Fourth Embodiment. In FIG. 20, P1001 shows a human body. P1002 and P1003 show regions inside of the explanatory region. P1004 shows a half line that passes through the arm with which the human body is giving an explanation.

In a case in which the half line P1004 and each region have a point of intersection, this region is specified as the region that is the target of the explanation (the explanatory region). Note that it is possible to find whether or not a straight line and a rectangular region have a point of intersection using intersection determination.

In FIG. 20, the half-line P1004 and the region P1003 have a point of intersection, and therefore, it is possible to specify the region in which the human body is giving the explanation. In a case in which information for an explanatory region that matches the verbal explanation has been input, this is made the region that is the target of the explanation that has been specified (the explanatory region).

The overlap determining unit D1022 determines whether or not a region of the human body overlaps with the specified explanatory region. Specifically, the specified explanatory region, the region information, the video image information, and the explanatory materials that have all been input from the explanatory region specifying unit D1021 are used, and whether or not a region of the human body overlaps with the specified explanatory region is determined.

In a case in which the result of the determination is that a region of the human body overlaps with the specified explanatory region, the overlap determining unit D1022 outputs the explanatory region that has been specified, the video image information, and the explanatory materials to the emphasis box superimposing unit D1023. In contrast, in a case in which a region of the human body does not overlap with the explanatory region that has been specified, the region information, video image information, and explanatory materials are output to the overlapping region extracting unit A1009.

The emphasis box superimposing unit D1023 performs an emphasized display of the explanatory region of the explanatory materials. Specifically, the explanatory region that was specified, the video information, and the explanatory materials that have been input from the overlap determining unit D1022 are used, and an emphasis box is superimposed onto the explanatory region of the explanatory materials. The emphasis box superimposing unit D1023 outputs the explanatory materials onto which this has been superimposed and the video image information to the image superimposing unit D1011.

Note that color may be added to the emphasis box for which an emphasized display is performed, or it may also be made such that the thickness of the box's lines can be changed. In addition, the color inside of the explanatory region may also be changed to become a color that is different from the color of the explanatory region, or it may also be made such that the color, font, or size of diagrams and characters within the explanatory region are changed. In addition, the emphasis box may be made so as to flash, or it may also be made such that an emphasized display is performed using a combination of these methods.

The image superimposing unit D1011 superimposes the explanatory materials onto the video image information. Specifically, in a case in which explanatory materials, onto which an emphasis box has been superimposed, and video image information have been input from the emphasis box superimposing unit D1023, and explanatory materials for which the transparency of the region that overlaps with the human body has been changed have been input from the transparency changing unit A1010, the explanatory materials for which the transparency has been changed are superimposed onto the video image information.

In addition, in a case in which explanatory materials for which the transparency has been changed have not been input from the transparency changing unit A1010, explanatory materials for which the transparency has not been changed (the explanatory materials that have been input from the materials acquisition unit A1005) are superimposed onto the video image information.

In addition, in a case in which information to not continue changing the transparency has been input from the determining unit B1018, explanatory materials for which the transparency has not been changed are superimposed onto the video image information. The image superimposing unit D1011 outputs the video image information onto which these explanatory materials have been superimposed to the video image output unit A1012.

In this context, one example of the superimposition processing for the image superimposing unit D1011 of the Third Embodiment will be explained below with reference to FIGS. 21A-D, FIGS. 22A-D, and FIGS. 23A-D.

Figure 21A:
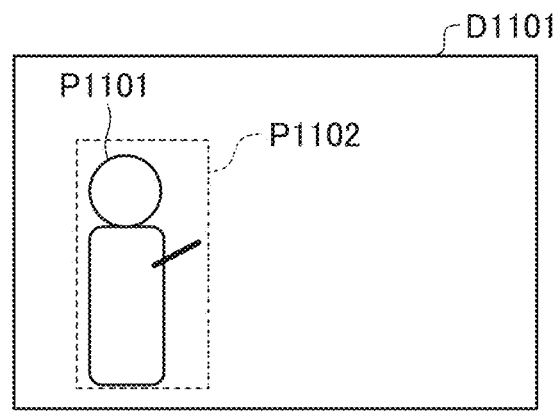
FIGS. 21A to 21D are diagrams explaining a state in which explanatory materials in which a region that overlaps with a human body region has been made transparent have been superimposed onto a video image captured of the human body in a case in which an explanatory region did not overlap with the human body when the human body performed an explanatory action according to the Fourth Embodiment.
Figure 21B:
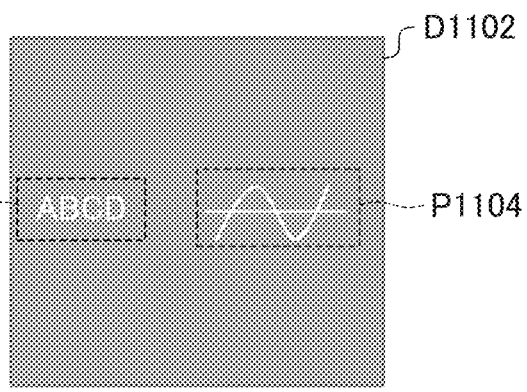
Figure 21C:
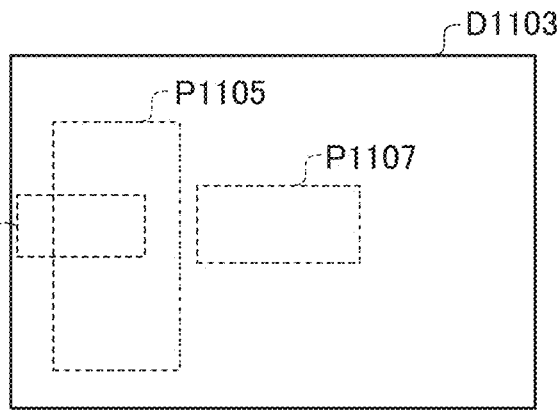
Figure 21D:
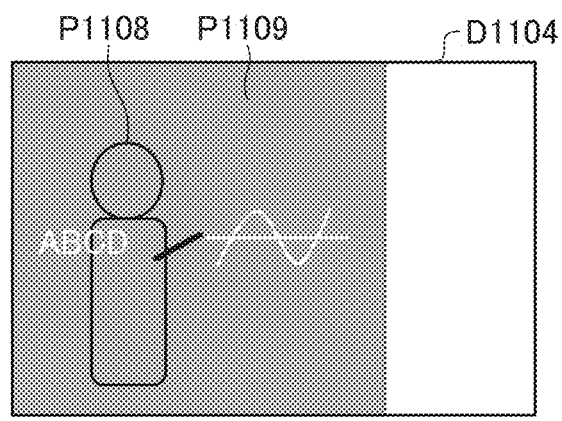

FIGS. 21A-D are diagrams showing one example of a case in which the human body and the explanatory region do not overlap. FIG. 21A is a diagram showing one example of video image information. FIG. 21B is a diagram showing one example of explanatory materials. FIG. 21C is a diagram showing one example in which the overlap between the human body region and the region for the explanatory materials is shown. FIG. 21D is a diagram showing one example of a region that is the target of the explanation (the explanatory region).

In FIGS. 21A-D, D1101 shows video image information, D1102 shows the explanatory materials, D1103 is a diagram in which the overlap between the human body region and the region for the explanatory materials is shown, and D1104 shows video image information in which the explanatory materials D1102 have been super imposed onto the video image information D1101.

P1101 shows a human body. P1102 shows a human body region. P1103 shows a region that is not a target of the explanation. P1104 shows the explanatory region. P1105, P1106, and P1107 are respectively the same as P1102, P1103, and P1104, and therefore explanations thereof will be omitted. P1108 shows the same human body as P1101. P1109 shows the explanatory materials. At this time, the human body region P1105 and the explanatory region P1107 do not overlap.

Therefore, in D1104, the region that overlaps with the human body region in the explanatory materials P1109 (the superimposition region) is made transparent and superimposed onto the video image information. In this manner, in FIG. 21, the human body and the explanatory region do not overlap, and therefore, it is possible to see the explanatory region even if the explanatory region that overlaps with the human body region is made transparent.

Figure 22A:
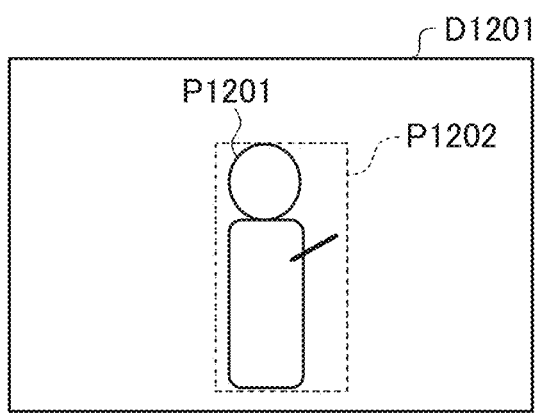
FIGS. 22A to 22D are diagrams explaining a state in which explanatory materials in which emphasis processing has been performed on an explanatory region are superimposed onto a video image captured of a human body in a case in which the explanatory region and the human body overlapped when the human body performed an explanatory action according to the Fourth Embodiment.
Figure 22B:
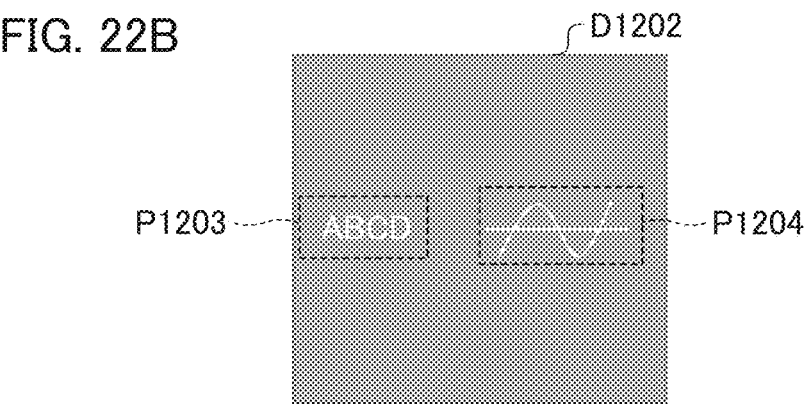
Figure 22C:
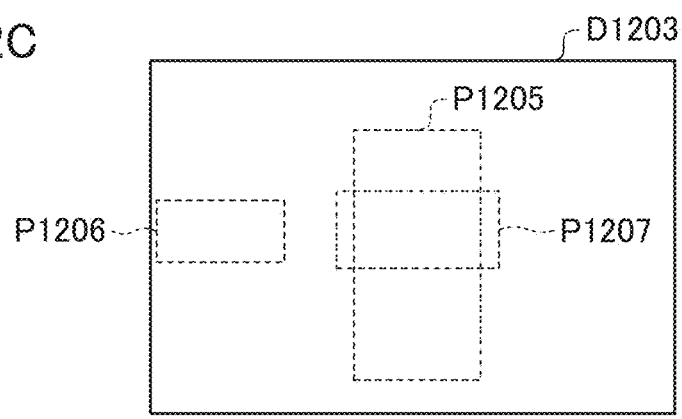
Figure 22D:
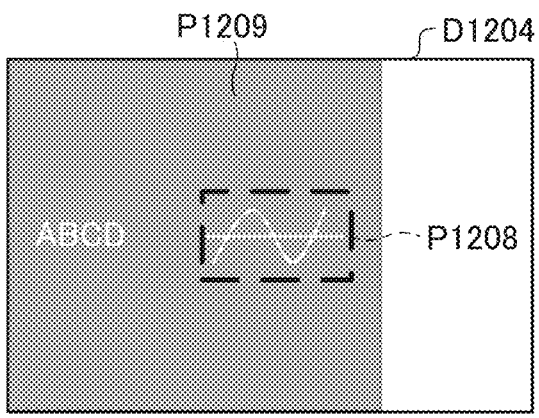

FIGS. 22A-D are diagrams showing one example of a case in which a human body and the explanatory region overlap. FIG. 22A is a diagram showing one example of video image information. FIG. 22B is a diagram showing one example of explanatory materials. FIG. 22C is a diagram of one example showing the overlap between the human body region and the region of the explanatory materials. FIG. 22D is a diagram showing one example of a region that is the target of the explanation (an explanatory region).

In FIGS. 22A-D, D1201 shows video image information, D1202 shows the explanatory materials, D1203 is a diagram showing the overlap between the human body region and the region for the explanatory materials, and D1204 shows video image information in which the explanatory materials D1202 have been superimposed onto the video image information D1201.

P1201 shows a human body. P1202 shows a human body region. P1203 shows a region that is not the target of the explanation. P1204 shows the explanatory region. P1205, P1206, and P1207 are respectively the same as P1202, P1203, and P1204, and therefore explanations thereof will be omitted. P1208 shows an emphasis box that has been superimposed onto the explanatory region. P1209 shows explanatory materials. At this time, the human body region P1205 and the explanatory region P1207 are overlapping.

Therefore, in D1204, an emphasis box P1208 is superimposed onto the explanatory region in the explanatory region P1209. In this manner, in a case in which the explanatory region overlaps with a human body that has performed an active explanation (an explanatory action), even if it is not possible to see the human body due to emphasis processing being performed in the explanatory region, it is possible to confirm the explanatory region.

Figure 23A:
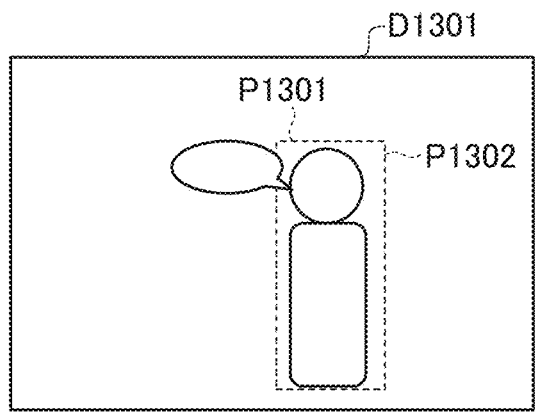
FIGS. 23A to 23D are diagrams explaining a state in which explanatory materials in which emphasis processing has been performed on an explanatory region are superimposed onto a video image captured of a human body in a case in which the explanatory region and the human body overlapped when the human body gave a verbal explanation according to the Fourth Embodiment.
Figure 23B:
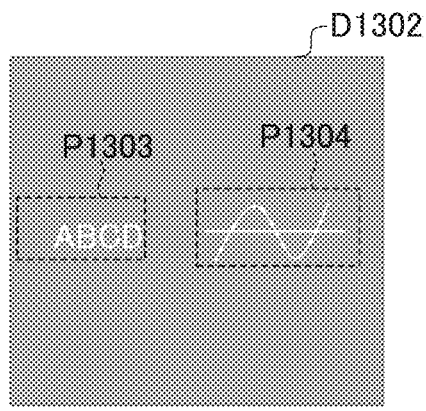
Figure 23C:
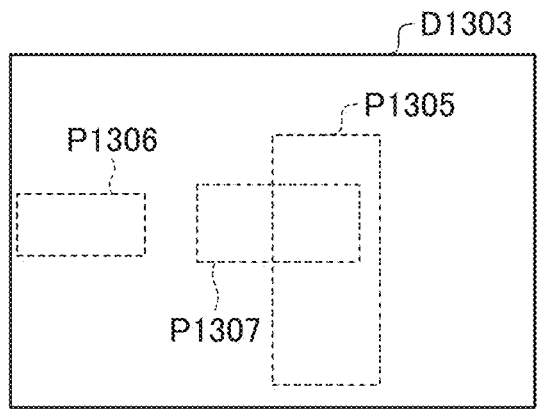
Figure 23D:
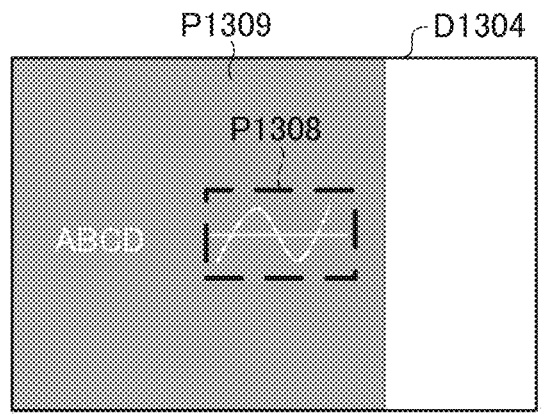

FIGS. 23A-D are diagrams showing one example of a case in which the human body and the explanatory region overlap. FIG. 23A is a diagram showing one example of video image information. FIG. 23B is a diagram showing one example of explanatory materials. FIG. 23C is a diagram for one example showing the overlap between the human body region and the region for the explanatory materials. FIG. 23D is a diagram showing one example of a region that is the target of the explanation (the explanatory region).

In FIGS. 23A-D, D1301 shows the video image information, D1302 shows the explanatory materials, D1303 is a diagram showing the overlap between the human body region and region of the explanatory materials, and D1304 shows video image information in which the explanatory materials D1302 have been superimposed onto the video image information D1301.

P1301 shows a human body. P1302 shows a human body region, and P1303 shows a region that is not the target of the explanation. P1304 shows the explanatory region. P1305, P1306, and P1307 are respectively the same as P1302, P1303, and P1304, and therefore explanations thereof will be omitted.

P1308 shows an emphasis box that has been superimposed onto the explanatory materials. P1309 shows the explanatory materials. At this time, the human body region P1305 and the explanatory region P1307 are overlapping.

Therefore, in D1304, an emphasis box is superimposed onto the explanatory region in the explanatory materials P1309. In a case in which a human body that has given a verbal explanation in this manner overlaps with the explanatory region, it is possible to confirm the explanatory region even if it is not possible to see the human body because emphasis processing is being performed on the explanatory region.

Figure 24:
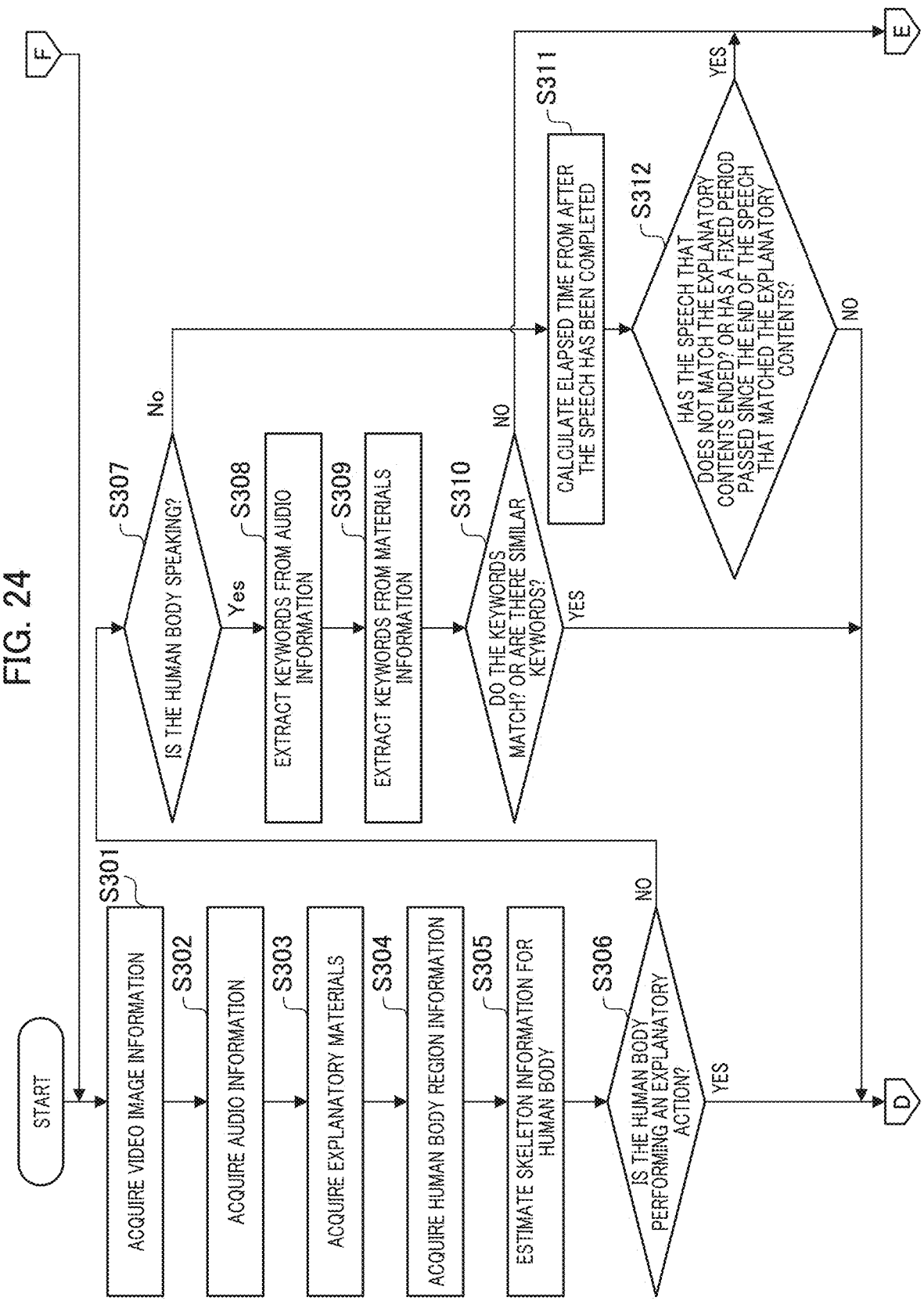
FIG. 24 is flowchart showing processing procedures for an automatic image capturing system according to the Fourth Embodiment.

In this context, the order in which processing is performed for the automatic image capturing system D1000 will be explained while referencing the flowcharts in FIG. 24 and FIG. 25. FIG. 24 and FIG. 25 are flowcharts showing the processing procedures for the automatic image capturing system D1000 according to the Fourth Embodiment.

Each processing below is realized by the CPU 11 of the image superimposing apparatus D1003 executing a program that has been stored on the ROM 12 or the like. In addition, the notation of each process (step) is abbreviated by adding an "S" to the beginning of each process (step). Upon the automatic image capturing system D1000 being started up by a user operation via the input apparatus or the like, the automatic image capturing system is started.

First, during S301, the video image acquisition unit A1004 acquires video image information from the video image acquisition apparatus A1001. After this, the processing proceeds to S302.

Next, during S302, the audio input unit B1015 acquires audio information from the audio acquisition apparatus B1014. After this, the processing proceeds to S303.

Next, during S303, the materials acquisition unit A1005 acquires the explanatory materials from the materials acquisition apparatus A1002. After the acquisition of the explanatory materials, the materials acquisition unit A1005 outputs the explanatory materials that have been acquired to the overlapping region extracting unit A1009 and the image superimposing unit D1011. After this, the processing proceeds to S304.

Next, during S304, the region division processing unit A1008 performs region division processing using the video image information that has been acquired from the video image acquisition unit A1004. In addition, the region division processing unit A1008 outputs the region information that has been divided to the overlapping region extracting unit A1009. After this, the processing proceeds to S305.

Next, during S305, the skeleton information estimating unit A1006 uses the video image information that has been acquired from the video image acquisition unit A1004 and estimates the skeleton information for the human body. The skeleton information estimating unit A1006 outputs the skeleton information that has been estimated to the human body action determining unit A1007 to serve as skeleton estimation results. After this, the processing proceeds to S306.

Next, during S306, the human body action determining unit A1007 estimates an action of the human body by using the skeleton estimation results for the human body that have been acquired from the skeleton information estimating unit A1006, and determines whether or not this is an explanatory action.

In a case in which as a result of the determination, this was an explanatory action (YES during S306), the human body action determining unit A1007 outputs the determination results and the skeleton estimation results to the explanatory region specifying unit D1021. After this, the processing proceeds to S313. In contrast, in a case in which this was not an explanatory action (NO during S306), the determined results are output to the image superimposing unit D1011. After this, the processing proceeds to S307.

Next, during S307, the speech determining unit B1016 performs voice segment detection using the audio information that has been input from the audio input unit B1015, and determines whether or not the human body is giving a verbal explanation. In a case in which as the result of this determination a verbal explanation is being given (YES during S307), the speech determining unit B1016 outputs the information that the human body is giving a verbal explanation (first information) to the keyword extracting unit C1019. After this, the processing proceeds to S308.

In contrast, in a case in which a verbal explanation is not being given (NO during S307), information that the human body is not speaking (second information) is output to the elapsed time calculating unit C1017. After this, the processing proceeds to S311.

Next, during S308, the keyword extracting unit C1019 extracts keywords from the audio information that has been input from the speech determining unit B1016. In addition, the keyword determining unit C1019 outputs the keywords that have been extracted to the match determining unit C1020. After this, the processing proceeds to S309.

Next, during S309, the keyword extracting unit C1019 extracts keywords from the explanatory materials that have been input from the materials acquisition unit A1005. The keyword extracting unit C1019 outputs the keywords that have been extracted to the match determining unit C1020. After this, the processing proceeds to S310. Note that the processing order for the processing for S308 and S309 may also be reversed.

Next, during S310, the match determining unit C1020 determines if the keywords that have been extracted from the audio information and the keywords that have been extracted from the explanatory materials that have been input from the keyword extracting unit C1019 match or are similar.

In a case in which, as a result of this determination, the audio information and the keywords match or are similar (YES during S310), the match determining unit C1020 outputs information that the explanatory contents match (third information) to the explanatory region specifying unit D1021. After this, the processing proceeds to S313.

In contrast, in a case in which the audio information and the keywords do not match and are not similar (NO during S310), the match determining unit C1020 outputs information that the explanatory contents do not match (fourth information) to the image superimposing unit D1011. After this, the processing proceeds to S318.

During S311, the elapsed time calculating unit C1017 calculates the elapsed time from when the speech for which the contents do not match the explanatory materials has been completed based on the second information that has been input from the speech determining unit B1016 and the fourth information that has been input from the match determining unit C1020. The elapsed time calculating unit C1017 outputs the time that has been calculated (the elapsed time) to the determining unit B1018. After this, the processing proceeds to S312.

Next, during S312, the determining unit B1018 determines whether or not the speech that does not match the explanatory materials has finished or the elapsed time since the speech that does match the explanatory materials has finished exceeds a fixed time based on the elapsed time that has been input from the elapsed time calculating unit C1017.

In a case in which, as a result of this determination, the speech that does not match the explanatory materials has finished or the elapsed time exceeds a fixed time (YES during S312), the determining unit B1018 outputs information to not make the explanatory materials transparent to the image superimposing unit D1011. After this, the processing proceeds to S318.

In contrast, in a case in which the speech that does not match the explanatory contents is not finished, or the elapsed time does not exceed a fixed time (NO during S312), the determining unit B1018 outputs information to make the explanatory materials transparent to the overlapping region extracting unit A1009. After this, the processing proceeds to S313.

Next, during S313, the explanatory region specifying unit D1021 specifies the region that the human body is explaining (the explanatory region). When specifying the region that the human body is explaining, this is specified using the information for the skeleton estimation results for the human body, the video image information, the explanatory materials, and the information that the explanatory contents matched (the third information).

The skeleton estimation results for the human body and the video image information are input from the human body action determining unit A1007. The region information is input from the region division processing unit A1008. The explanatory materials are input from the materials acquisition unit A1005.

The information that the explanatory contents matched (the third information) is input from the match determining unit C1020. In addition, the explanatory region specifying unit D1021 outputs the region information, the explanatory region that has been specified, the explanatory materials, and the video image information to the overlap determining unit D1022. After this, the processing proceeds to S314.

Next, during S314, the overlap determining unit D1022 determines whether or not the human body region and the explanatory region overlap from the region information, specified explanatory region, explanatory materials, and video information that have been input from the explanatory region setting unit D1021.

In a case in which the human body region and the explanatory region overlap (YES during S314), the overlap determining unit D1022 outputs the explanatory region that has been specified, the video image information, and the explanatory materials to the emphasis box superimposing unit D1023. After this, the processing proceeds to S315. In contrast, in a case in which the human body region and the explanatory region do not overlap (NO during S314), the overlap determining unit D1022 outputs the video image information, the explanatory materials, and the region information to the overlapping region extracting unit A1009. After this, the processing proceeds to S316.

Next, during S315, the emphasis box superimposing unit D1023 uses the specified explanatory region, the video image information, and the explanatory materials that have been input from the overlap determining unit D1022 and superimposes an emphasis box onto the explanatory region of the explanatory materials that has been specified. The emphasis box superimposing unit D1023 outputs the explanatory materials on which this has been superimposed and the video image information to the image superimposing unit D1011. After this, the processing proceeds to S318

During S316, the overlapping region extracting unit A1009 extracts the overlapping region by using the region information for the human body that has been input from the overlap determining unit D1022 and the explanatory materials that have been input from the materials acquisition unit A1005. In addition, the overlapping region extracting unit A1009 outputs the overlapping region that has been extracted to the transparency changing unit A1010. After this, the processing proceeds to S317.

Next, during S317, the transparency changing unit A1010 uses the explanatory materials and the overlapping region that have been input from the overlapping region extracting unit A1009 to change the transparency of the explanatory materials (makes these transparent). In addition, the transparency changing unit A1010 outputs the explanatory materials for which the transparency has been changed to the image superimposing unit D1011. After this, the processing proceeds to S318.

Next, during S318, the image superimposing unit D1011 superimposes the explanatory materials onto the video image information. In this context, in a case in which explanatory materials for which the transparency has been changed have been input from the transparency changing unit A1010, these explanatory materials for which the transparency has been changed are superimposed onto the video image information. In addition, in a case in which information has been input to not change the transparency from the determining unit B1018, the explanatory materials that have been input from the materials acquisition unit A1005 for which the transparency has not been changed are superimposed onto the video image information.

In addition, in a case in which information that the contents of the speech and the contents of the explanatory materials do not match (fourth information) has been input from the match determining unit C1020 as well, the explanatory materials that have been input from the materials acquisition unit A1005 for which the transparency has not been changed are superimposed onto the video image information.

In addition, in a case in which an explanatory region onto which an emphasis box has been superimposed has been input from the emphasis box superimposing unit D1023, the explanatory materials onto which the emphasis box has been superimposed are superimposed onto the video image information. In addition, the image superimposing unit D1011 outputs the video image onto which these have been superimposed to the video image output unit A1012. After this, the processing proceeds to S319.

Next, during S319, the video image output unit A1012 outputs the video image that has been input from the image superimposing unit D1011 (the superimposed video image) to the monitor apparatus A1013. In a case in which this video image information has been input from the video image output unit A1012, the monitor apparatus A1013 displays video images or images in this video image information on the screen. After this, the processing proceeds to S320.

Next, during S320, whether or not to complete the processing is determined. Specifically, it is identified whether or not the On/Off switch of the automatic image capturing system, which is not shown, has been operated by a user operation and a stopping operation for the automatic image capturing processing has been performed.

In a case in which, as a result of this determination, a stopping operation has not been performed for the automatic image capturing processing (NO during S320), the processing proceeds to S301, and the same processing is repeated. In contrast, in a case in which a stopping operation for the automatic image capturing processing has been performed (YES during S320), the automatic image capturing processing is completed, and the flow of the present processing is completed.

In the above manner, when superimposing explanatory materials onto a video image that has been captured of a human body, the automatic image capturing system D1000 in the Fourth Embodiment superimposes an emphasis box on a region that is the target of the explanation when the human body is performing an explanatory action or giving a verbal explanation in the case in which the human body and the region that is the target of the explanation overlap.

In contrast, in a case in which the human body and the region that is the target of the explanation do not overlap, the transparency of a region of the explanatory materials that overlaps with the human body is made transparent and the explanatory materials are superimposed onto the video image information. It is thereby possible to confirm the region that is the target of the explanation on the screen even in a case in which the human body and the region that is the target of the explanation overlap.

Although example embodiments have been explained above, some embodiments are not limited to these embodiments, and a variety of alterations and changes are possible within the scope of the gist thereof. In addition, although a plurality of embodiments has been described above, embodiments are also possible in which the embodiments are, for example, a system, an apparatus, a method, a program, a recording medium, or the like (a storage medium).

For example, the present disclosure may be applied to a system configured by a plurality of devices (for example, a host computer, an interface device, an image capturing apparatus, a web application, or the like), or, it may also be applied to an apparatus that comprises one device. In addition, for example, it may also be made such that a portion or the entirety of the functions of each of the functional units that is shown in FIG. 1 are included in an apparatus that is different from the image superimposing apparatus A1003.

For example, it may be made such that an apparatus that is different from the image superimposing apparatus A1003, or a storage device has these functional units, and the functions of each embodiment are realized by performing communications based on a wired or wireless connection with the image superimposing apparatus A1003. As the different apparatus, there is, for example, the video image acquisition apparatus A1001, the materials acquisition apparatus A1002, an information processing apparatus that is not shown, a server that is not shown, or the like.

In addition, for example, it may also be made such that one or more of the functional units in FIG. 1 are realized by one or more computers that are different from the image superimposing apparatus A1003. In addition, the image superimposing apparatus A1003 may also have the same functions as the video image acquisition apparatus A1001, the materials acquisition apparatus A1002, and the monitor apparatus A1013, or the like.

In this case, for example, the image superimposing apparatus A1003 can be configured so as to acquire images and generate video images from the acquired images. In addition, for example, the image superimposing apparatus A1003 can be configured so as to acquire the explanatory materials. In addition, for example, this can be configured so as to display video images and images such as superimposed video images, superimposed images, and the like.

In addition, it may also be made such that one or more apparatuses that are different from the image superimposing apparatus A1003 have a portion or the entirety of the functions of each functional unit in FIG. 1, and it is also possible for the image superimposing apparatus A1003 to be made so as to have all of the functions of FIG. 1. The same also applies to FIG. 11, FIG. 15, and FIG. 19. That is, the same also applies to the image superimposing apparatuses B1003, C1003, and D1003.

While the present disclosure has described exemplary embodiments, it is to be understood that some embodiments are not limited to the disclosed exemplary embodiments. The scope of the following claims is to be accorded the broadest interpretation to encompass all such modifications and equivalent structures and functions.

In addition, as a part or the whole of the control according to the embodiments, computer-executable instructions realizing the function of the embodiments described above may be supplied to the information processing apparatus or the like through a network or various storage media. Then, a computer (or a CPU, an MPU, or the like) of the information processing apparatus or the like may be configured to read and execute the computer-executable instructions. In such a case, the computer-executable instructions and the storage medium storing the computer-executable instructions configure the embodiments.

In addition, some embodiments also include modes that are realized by, for example, using at least one processor or circuit configured to function as the embodiments explained above. Note that a plurality of processors may also be used and made to performed distributed processing.

This application claims priority to Japanese Patent Application No. 2023-073644, which was filed on Apr. 27, 2023 and which is hereby incorporated by reference herein in its entirety.

What is claimed is:

1. An information processing apparatus comprising:
   at least one memory; and
   at least one processor, wherein the at least one memory and the at least one processor are configured to:
   extract a region of a human in an image;
   superimpose predetermined superimposition information onto the image;
   determine whether or not the human is performing a predetermined action, and to output determination results;
   extract a region of the predetermined superimposition information that overlaps with the region of the human as an overlapping region based on the determination results, the region of the human, and the predetermined superimposition information;
   change a transparency of at least a portion of the predetermined superimposition information such that the transparency thereof increases according to the overlapping region;
   determine whether or not the human is speaking based on audio information;
   determine that the human is giving a verbal explanation in a case in which it has been determined that the human is speaking;
   output first information in a case in which it has been determined that the human is speaking;
   output second information in a case in which it has been determined that the human is not speaking;
   extract keywords from both the audio information and the predetermined superimposition information;
   determine whether or not keywords that were extracted from the audio information and keywords that were extracted from the predetermined superimposition information match or are similar to each other;
   output third information in a case in which it has been determined that the keywords that have been extracted from the audio information and the keywords that have been extracted from the predetermined superimposition information match or are similar to each other;
   output fourth information in a case in which it has been determined that the keywords that have been extracted from the audio information and the keywords that have been extracted from the predetermined superimposition information do not match and are not similar to each other;
   calculate a time from when the human has finished speaking based on the second information and the fourth information; and
   output the calculated time.

2. The information processing apparatus according to claim 1, wherein in a case in which it has been determined that the human is not performing the predetermined action, the at least one memory and the at least one processor are further configured to superimpose the predetermined information onto the image without changing a transparency of the image.

3. The information processing apparatus according to claim 1, wherein in a case in which it has been determined that the human is performing the predetermined action, the at least one memory and the at least one processor are further configured to extract the overlapping region from the image.

4. The information processing apparatus according to claim 1, wherein the at least one memory and the at least one processor are further configured to change a transparency of the overlapping region.

5. The information processing apparatus according to claim 1, wherein the at least one memory and the at least one processor are further configured to:
   detect a human from the image, estimate a skeleton of the human that was detected, and output estimation results; and
   determine whether or not the human is performing the predetermined action based on the estimation results.

6. The information processing apparatus according to claim 5, wherein the at least one memory and the at least one processor are further configured to extract a portion of the human as an overlapping region when extracting the overlapping region.

7. The information processing apparatus according to claim 1, wherein the predetermined action includes an action of moving at least an arm.

8. The information processing apparatus according to claim 1, wherein the at least one memory and the at least one processor are further configured to control displaying an image or a video image, on which superimposition has been performed, on a screen of a display apparatus.

9. The information processing apparatus according to claim 1, wherein the at least one memory and the at least one processor are further configured to continue to change the transparency of the predetermined superimposition information until a predetermined time has elapsed since the human has finished speaking based on the calculated time.

10. The information processing apparatus according to claim 1, wherein the at least one memory and the at least one processor are further configured to specify an explanatory region that is a region in which the human is performing the predetermined action or giving a verbal explanation from the predetermined superimposition information.

11. The information processing apparatus according to claim 10, wherein the at least one memory and the at least one processor are further configured to perform an emphasized display of the explanatory region.

12. A control method for an information processing apparatus, the control method comprising:
- extracting in which a region of a human in an image is extracted;
- superimposing in which predetermined superimposition information is superimposed onto the image;
- determining in which whether or not the human performed a predetermined action is determined, and determination results are output;
- extracting in which a region of the predetermined superimposition information that overlaps with the region of the human is extracted as an overlapping region based on the determination results, the region of the human, and the predetermined superimposition information;
- changing in which a transparency of at least a portion of the predetermined superimposition information is changed such that the transparency is increased according to the overlapping region;
- determining whether or not the human is speaking based on audio information;
- determining that the human is giving a verbal explanation in a case in which it has been determined that the human is speaking;
- outputting first information in a case in which it has been determined that the human is speaking;
- outputting second information in a case in which it has been determined that the human is not speaking;
- extracting keywords from both the audio information and the predetermined superimposition information;
- determining whether or not keywords that were extracted from the audio information and keywords that were extracted from the predetermined superimposition information match or are similar to each other;
- outputting third information in a case in which it has been determined that the keywords that have been extracted from the audio information and the keywords that have been extracted from the predetermined superimposition information match or are similar to each other;
- outputting fourth information in a case in which it has been determined that the keywords that have been extracted from the audio information and the keywords that have been extracted from the predetermined superimposition information do not match and are not similar to each other;
- calculating a time from when the human has finished speaking based on the second information and the fourth information; and
- outputting the calculated time.

13. A non-transitory computer-readable storage medium configured to store computer-executable instructions that, when executed by a computer, cause the computer to execute the following processes:
- extracting in which a region of a human in an image is extracted;
- superimposing in which predetermined superimposition information is superimposed onto the image;
- determining in which whether or not the human performed a predetermined action is determined, and determination results are output;
- extracting in which a region of the predetermined superimposition information that overlaps with the region of the human is extracted as an overlapping region based on the determination results, the region of the human, and the predetermined superimposition information;
- changing in which a transparency of at least a portion of the predetermined superimposition information is changed such that the transparency is increased according to the overlapping region;
- determining whether or not the human is speaking based on audio information;
- determining that the human is giving a verbal explanation in a case in which it has been determined that the human is speaking;
- outputting first information in a case in which it has been determined that the human is speaking;
- outputting second information in a case in which it has been determined that the human is not speaking;
- extracting keywords from both the audio information and the predetermined superimposition information;
- determining whether or not keywords that were extracted from the audio information and keywords that were extracted from the predetermined superimposition information match or are similar to each other;
- outputting third information in a case in which it has been determined that the keywords that have been extracted from the audio information and the keywords that have been extracted from the predetermined superimposition information match or are similar to each other;
- outputting fourth information in a case in which it has been determined that the keywords that have been extracted from the audio information and the keywords that have been extracted from the predetermined superimposition information do not match and are not similar to each other;
- calculating a time from when the human has finished speaking based on the second information and the fourth information; and
- outputting the calculated time.

\* \* \* \* \*